US010285146B2

(12) United States Patent
Urabayashi et al.

(10) Patent No.: US 10,285,146 B2
(45) Date of Patent: May 7, 2019

(54) BASE STATION AND USER TERMINAL

(71) Applicant: KYOCERA CORPORATION, Kyoto (JP)

(72) Inventors: Hiroyuki Urabayashi, Yokohama (JP); Chiharu Yamazaki, Tokyo (JP); Naohisa Matsumoto, Kawasaki (JP); Noriyoshi Fukuta, Inagi (JP); Kugo Morita, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/511,305

(22) PCT Filed: Sep. 16, 2015

(86) PCT No.: PCT/JP2015/076224
§ 371 (c)(1),
(2) Date: Mar. 15, 2017

(87) PCT Pub. No.: WO2016/047513
PCT Pub. Date: Mar. 31, 2016

(65) Prior Publication Data
US 2017/0289937 A1    Oct. 5, 2017

Related U.S. Application Data

(60) Provisional application No. 62/056,137, filed on Sep. 26, 2014.

(51) Int. Cl.
*H04W 56/00*    (2009.01)
*H04W 16/14*    (2009.01)
(Continued)

(52) U.S. Cl.
CPC ......... *H04W 56/001* (2013.01); *H04W 16/14* (2013.01); *H04W 48/16* (2013.01);
(Continued)

(58) Field of Classification Search
CPC . H04W 16/14; H04W 24/10; H04W 72/1215; H04W 74/0808; H04W 72/0453;
(Continued)

(56) References Cited

U.S. PATENT DOCUMENTS

| 2014/0086193 A1 | 3/2014 | Suzuki et al. |
| 2014/0112289 A1* | 4/2014 | Kim ...................... H04W 16/14 370/329 |

(Continued)

FOREIGN PATENT DOCUMENTS

| EP | 2 712 246 A1 | 3/2014 |
| JP | 2003-124938 A | 4/2003 |

(Continued)

OTHER PUBLICATIONS

International Search Report issued in PCT/JP2015/076224; dated Dec. 1, 2015.

(Continued)

*Primary Examiner* — Will W Lin
(74) *Attorney, Agent, or Firm* — Studebaker & Brackett PC

(57) ABSTRACT

A base station manages a first cell and a second cell and communicates with a user terminal by carrier aggregation which is applied to the first cell and the second cell, the first cell being allocated a licensed band requiring a license and a second cell being allocated an unlicensed band not requiring a license. The base station includes: a transmitter configured to transmit a synchronization signal used for synchronization between the second cell and the user terminal, by at least one carrier selected from the unlicensed band based on a result of carrier sensing in the second cell; and a controller configured to instruct the user terminal to perform a detection operation of the synchronization signal for all or part of the carrier through the first cell.

12 Claims, 15 Drawing Sheets

(51) Int. Cl.
*H04W 48/16* (2009.01)
*H04W 72/04* (2009.01)
*H04W 74/08* (2009.01)
*H04W 88/02* (2009.01)
*H04W 88/08* (2009.01)

(52) U.S. Cl.
CPC ....... *H04W 56/00* (2013.01); *H04W 56/0015* (2013.01); *H04W 56/0025* (2013.01); *H04W 72/04* (2013.01); *H04W 74/0833* (2013.01); *H04W 88/02* (2013.01); *H04W 88/08* (2013.01)

(58) Field of Classification Search
CPC ........... H04W 56/001; H04W 56/0025; H04W 56/0015; H04W 74/0833; H04W 72/04; H04W 56/00; H04W 48/16; H04W 88/08; H04W 88/02
See application file for complete search history.

(56) References Cited

U.S. PATENT DOCUMENTS

| | | | |
|---|---|---|---|
| 2015/0050939 A1 | 2/2015 | Futaki et al. | |
| 2015/0131536 A1 | 5/2015 | Kaur et al. | |
| 2017/0118728 A1* | 4/2017 | Harada | H04W 52/38 |
| 2017/0171781 A1* | 6/2017 | Seo | H04W 28/26 |
| 2017/0238272 A1* | 8/2017 | You | H04W 56/0015 370/350 |
| 2017/0280425 A1* | 9/2017 | Yang | H04W 72/042 |
| 2017/0311206 A1* | 10/2017 | Ryoo | H04W 28/18 |

FOREIGN PATENT DOCUMENTS

| | | |
|---|---|---|
| JP | 2012-244378 A | 12/2012 |
| JP | 2014-500685 A | 1/2014 |
| WO | 2012/078565 A1 | 6/2012 |
| WO | 2013/161135 A1 | 10/2013 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.1.0; Mar. 2014; pp. 1-209; Release 12; 3GPP Organizational Partners.

* cited by examiner

FIG. 5
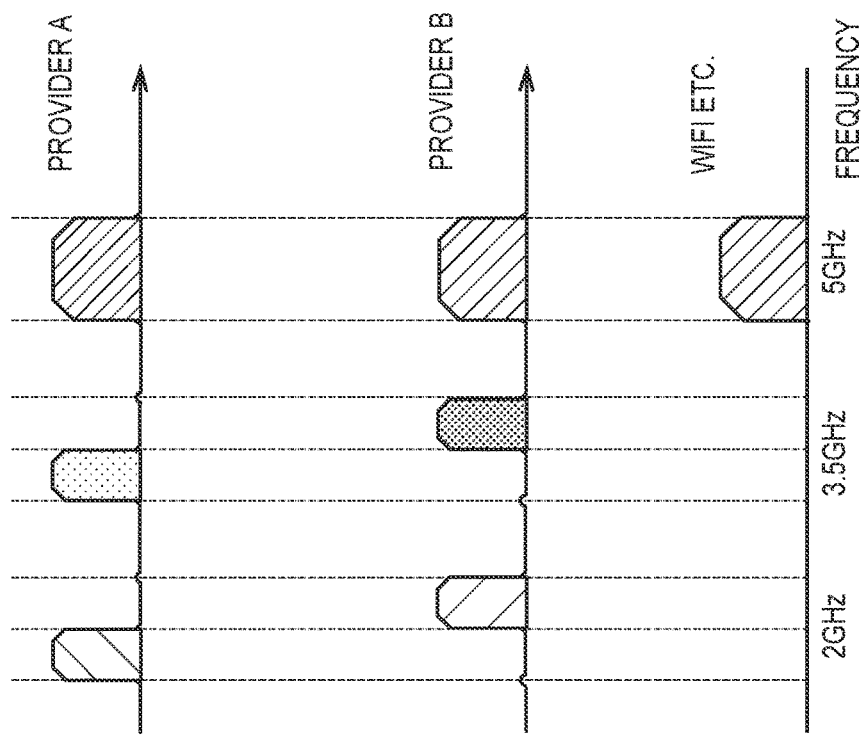
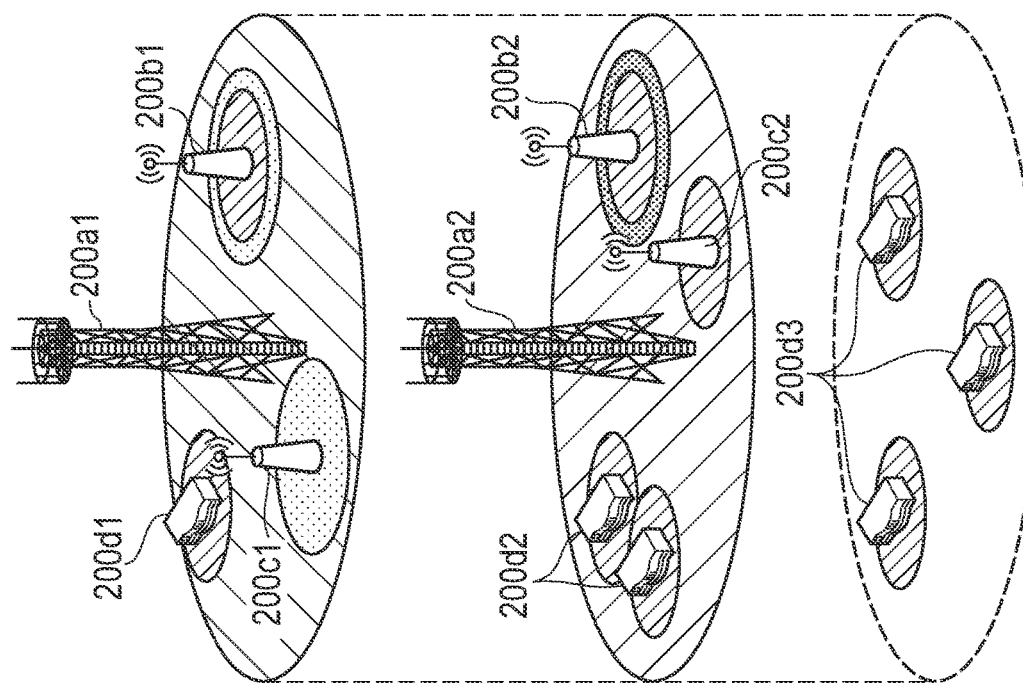

ONE EXAMPLE OF A NEW LTE PHYSICAL LAYER FOR UNLICENSED SPECTRUM
(GAP DURATION COULD BE CONFIGURABLE E.G., 1 OR 2 OFDM SYMBOLES)

AN EXAMPLE OF LTE BEACON TRANSMISSION

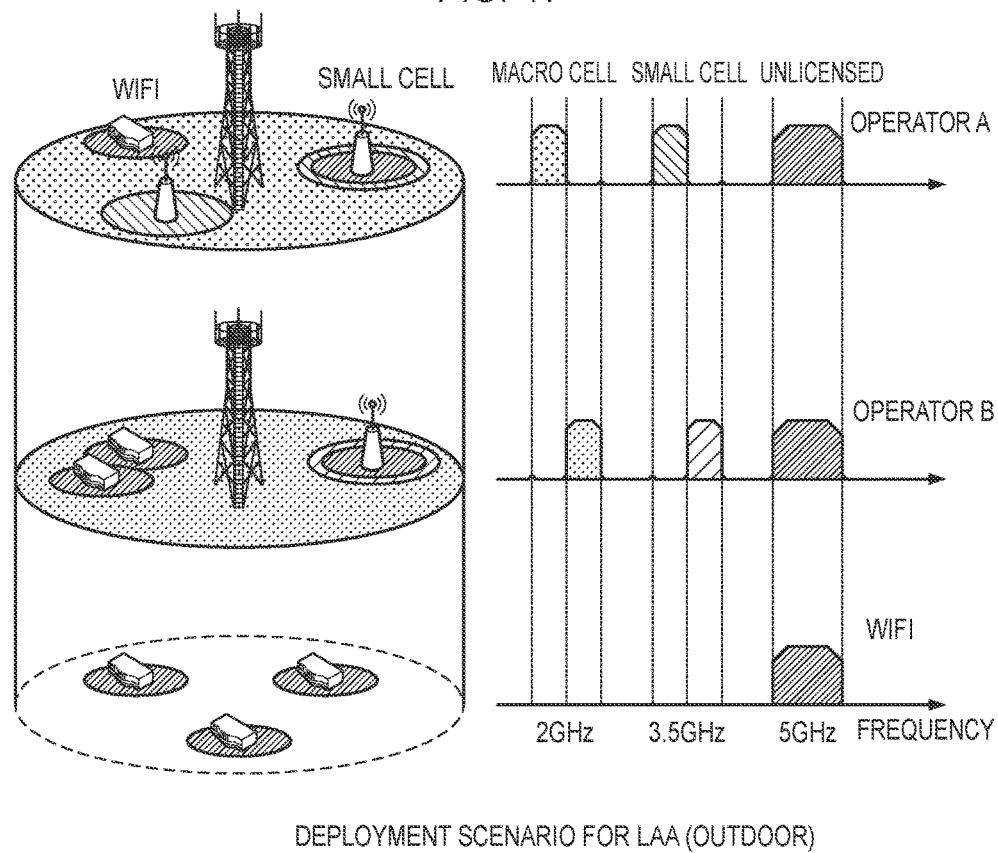

BASE STATION AND USER TERMINAL

CROSS REFERENCE

The entire contents of U.S. Provisional Application No. 62/056,137 (filed on Sep. 26, 2014) are incorporated herein by reference.

TECHNICAL FIELD

The present application relates to a base station and a user terminal which use an unlicensed band.

BACKGROUND ART

In 3GPP (3rd Generation Partnership Project) which is a project aiming to standardize a mobile communication system, use of a new frequency band or improvement in frequency utilization efficiency in LTE (Long Term Evolution) has been investigated in order to satisfy increasing traffic demand (for example, see Non-Patent Literature 1).

Specifically, in 3GPP, technology to enable a frequency band (unlicensed band) not requiring a license, which is used in the Wi-Fi (registered trademark, the same applies hereinafter), the Bluetooth (registered trademark, the same applies hereinafter) or the like, to be available in an LTE system (Licensed Assisted Access (LAA)) has been investigated. In LAA, carrier aggregation is applied to a licensed cell (Licensed LTE Cell (L-Cell)) using a licensed band requiring a license and an unlicensed cell (Unlicensed LTE Cell (U-Cell)) using an unlicensed band.

When a signal is transmitted by using an unlicensed band, by law (for example, the Radio Law in Japan), it is defined that a Listen before Talk (LBT) scheme using carrier sensing is based before transmission of the signal, in consideration of effect on communication by another mobile communication provider, such as the Wi-Fi which has been already operated.

On the other hand, in a conventional LTE specification, a user terminal (UE) needs to acquire configuration information of a secondary cell (SCell) and synchronize with the SCell in order for carrier aggregation. In the conventional LTE specification, the configuration information of the SCell is notified to the UE by a control signal from a base station (eNB) through a primary cell (PCell). For synchronization of the SCell and the UE, a synchronization signal transmitted from the eNB through the Scell is used.

CITATION LIST

Non Patent Literature

Non Patent Literature 1: 3GPP Technical Specification "GPP TS 36.300 V12.1.0" March, 2014

SUMMARY OF INVENTION

When the U-Cell is used in carrier aggregation, as described above, carrier sensing is required to be performed according to the LBT scheme before signal transmission in the U-Cell.

However, in the conventional LTE specification and LAA, a method of transmitting a signal in consideration of another communication in an unlicensed band and a method of synchronizing the U-Cell and the UE based on the LBT scheme have not been defined.

Therefore, it is an object of the present application to a base station and a user terminal, which enable synchronization between a cell and the user terminal in communication in which an unlicensed band is used.

A base station in a first feature manages a first cell and a second cell and communicates with a user terminal by carrier aggregation which is applied to the first cell and the second cell, the first cell being allocated a licensed band requiring a license and a second cell being allocated an unlicensed band not requiring a license. The base station includes: a transmitter configured to transmit a synchronization signal used for synchronization between the second cell and the user terminal, by at least one carrier selected from the unlicensed band based on a result of carrier sensing in the second cell; and a controller configured to instruct the user terminal to perform a detection operation of the synchronization signal for all or part of the carrier through the first cell.

A user terminal in a second feature communicates with a base station by carrier aggregation which is applied to a first cell and a second cell, the base station managing the first cell allocated a licensed band requiring a license and the second cell allocated an unlicensed band not requiring a license. The user terminal includes: a controller configured to perform a detection operation of a synchronization signal on all or part of the carrier, based on an instruction for the detection operation of the synchronization signal used for synchronization with the second cell, which is transmitted by at least one carrier among the unlicensed band, the instruction being performed from the base station through the first cell; and a transmitter configured to transmit a detection report indicating a result of the detection operation to the base station through the first cell.

A base station in a third feature manages a first cell and a second cell and communicates with a user terminal by carrier aggregation which is applied to the first cell and the second cell, the first cell being allocated a licensed band requiring a license and a second cell being allocated an unlicensed band not requiring a license. The base station includes: a transmitter configured to transmit at least one carrier of the unlicensed band, a temporal timing in the carrier, and configuration information of the second cell to the user terminal through the first cell, the at least one carrier being determined based on a result of carrier sensing in the second cell.

A user terminal in a fourth feature communicates with a base station by carrier aggregation which is applied to a first cell and a second cell, the base station managing the first cell allocated a licensed band requiring a license and the second cell allocated an unlicensed band not requiring a license. The user terminal includes: a receiver configured to receive at least one carrier of the unlicensed band, which is determined based on a result of carrier sensing in the second cell, a temporal timing in the carrier, and configuration information of the second cell, the result of carrier sensing being received from the base station through the first cell.

BRIEF DESCRIPTION OF DRAWINGS

FIG. 5 is a diagram for describing an application scenario according to the first embodiment and the second embodiment;

FIG. 17 is a diagram according to additional statement.

DESCRIPTION OF EMBODIMENTS

Hereinafter, a description will be given of embodiments in a case where the present application is applied to an LTE system that is a mobile communication system based on the 3GPP standard.

(1) LTE System

Figure 1:
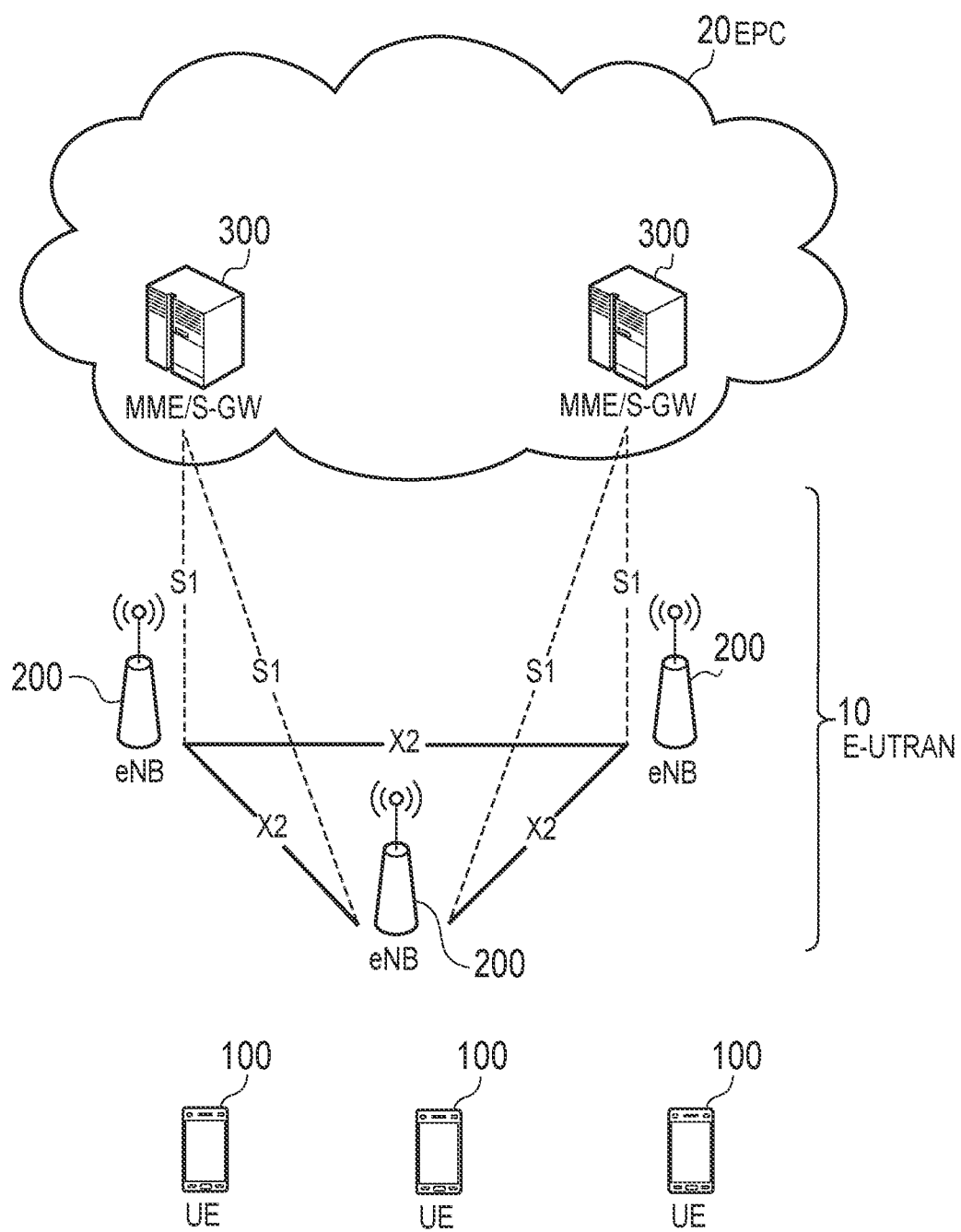
FIG. 1 is a diagram illustrating a configuration of an LTE system according to a first embodiment and a second embodiment.

FIG. 1 is a configuration diagram of an LTE system according to first and second embodiments.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell). The configuration of the UE 100 will be described later.

The E-UTRAN 10 corresponds to a radio access network. The E-UTRAN 10 includes a plurality of eNBs 200 (an evolved Node-Bs). The eNB 200 corresponds to a base station. The eNBs 200 are connected mutually via an X2 interface. The configuration of the eNB 200 will be described later.

The eNB 200 manages one or more cells and performs radio communication with the UE 100 connecting to the own cell. The eNB 200 has a radio resource management (RRM) function, a routing function for user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs various types of mobility control and the like for the UE 100. The S-GW performs transfer control of the user data. The the MME/S-GW 300 is connected to eNB 200 via an S1 interface.

The E-UTRAN 10 and the EPC 20 form a network of LTE system (hereinafter referred to as "LTE network"). The LTE network corresponds to a mobile network.

Figure 2:
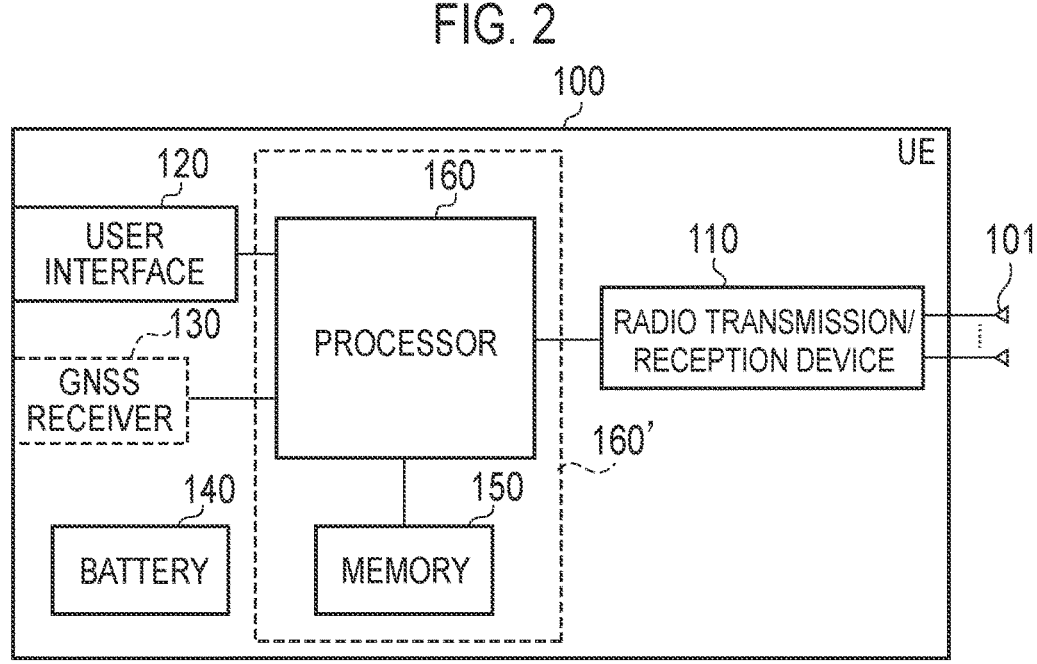
FIG. 2 is a diagram illustrating a hardware configuration of a UE according to the first embodiment and the second embodiment.

FIG. 2 is a hardware block diagram of the UE 100. As illustrated in FIG. 2, the UE 100 includes antennas 101, a radio transceiver 110, a user interface 120, a GNSS (Global Navigation Satellite System) receiver 130, a battery 140, a memory 150, and a processor 160. The memory 150 and the processor 160 form a controller. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (transmission signal) output from the processor 160 into a radio signal and transmits the radio signal from the antenna 101. Furthermore, the radio transceiver 110 converts a radio signal received by the antenna 101 into a baseband signal (received signal) and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100 and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
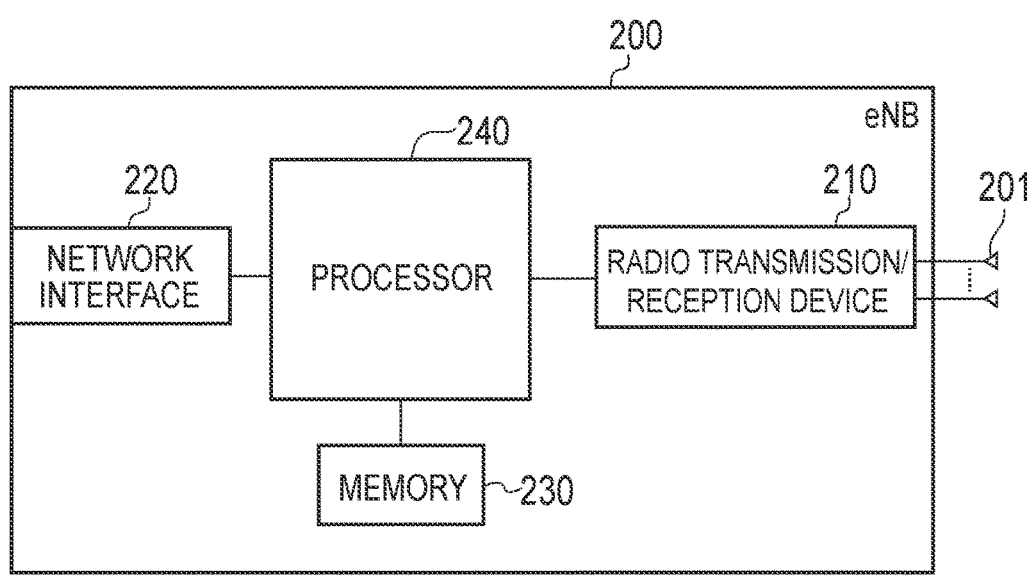
FIG. 3 is diagram illustrating a hardware configuration of an eNB according to the first embodiment and the second embodiment.

FIG. 3 is a block diagram of the eNB 200. As illustrated in FIG. 3, the eNB 200 includes antennas 201, a radio transceiver 210, a network interface 220, a memory 230, and a processor 240. The memory 230 and the processor 240 form a controller. The memory 230 may be integrally formed with the processor 240, and this set (that is, a chip set) may be called a processor.

The antenna 201 and the radio transceiver 210 are used to transmit and receive a radio signal. The radio transceiver 210 converts a baseband signal (transmission signal) output from the processor 240 into a radio signal and transmits the radio signal from the antenna 201. Furthermore, the radio transceiver 210 converts a radio signal received by the antenna 201 into a baseband signal (received signal) and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
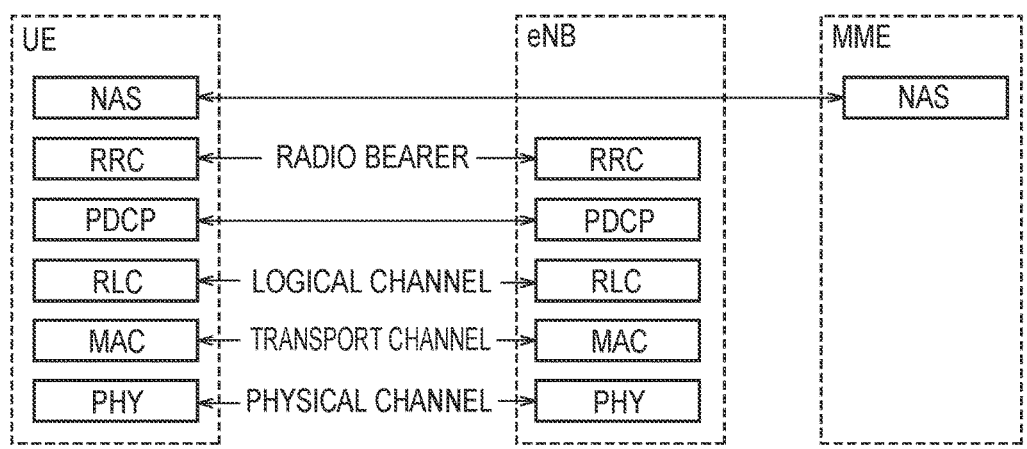
FIG. 4 is a diagram illustrating a protocol stack of a radio interface according to the first embodiment and the second embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is an RRC connection between the RRC of the UE 100 and the RRC of the eNB 200, the UE 100 is in a connected state. Otherwise, the UE 100 is in an idle state.

An NAS (Non-Access Stratum) layer positioned above the RRC layer performs session management, mobility management and the like.

(2) Application Scenario

Hereinafter, an application scenario of an LTE system according to the first embodiment and the second embodiment will be described. The LTE system according to the first embodiment and the second embodiment refers to a system which performs communication by using an unlicensed band that is a frequency band in which a license is not required, in addition to a licensed band that is a frequency band in which a license is required. The unlicensed band is a frequency band in which frequency sharing is possible by various devices which perform radio communication. The various devices include a base station or WLAN access point (WLAN AP) using the same scheme, which is operated by another mobile communication provider (hereinafter, referred to as a "provider"). The unlicensed band is a frequency band of 5 GHz used for, for example, the Wi-Fi or the Bluetooth.

FIG. 5 is a diagram for describing an application scenario according to the first embodiment and the second embodiment. As illustrated in FIG. 5, a network constructed by a provider A includes a macro base station 200a1, a small base station 200b1 and a small base station 200c1, which manage an unlicensed cell (hereinafter, referred to as a "U-Cell") in which an unlicensed band is used, and a WLAN AP 200d1 installed by the provider A. A network constructed by a provider B includes a macro base station 200a2, a small base station 200b2 and a small base station 200c2, which manage a U-Cell in which an unlicensed band is used, and a WLAN AP 200d2 installed by the provider B. In the example of FIG. 5, the network constructed by the provider A and the network constructed by the provider B are geographically located at the same position as each other. Furthermore, an WLAN AP 200d3 which performs communication using an unlicensed band is located geographically at the same position. The WLAN AP 200d3 may be a WLAN AP installed by a person, or may be a public WLAN AP. Also, the network and a device included in the network, which are illustrated in FIG. 5 are examples, and another network and another device may be included.

In the example of FIG. 5, a band of 5 GHz is an unlicensed band, and is shared by the provider A, the provider B, and the Wi-Fi. On the other hand, a frequency band other than the band of 5 GHz is a licensed band.

In the first embodiment and the second embodiment, the LTE system is applied to a scene in which, for example, in the network of the provider A, the UE 100 and the eNB 200 perform carrier aggregation using a carrier of the licensed band and a carrier of the unlicensed band. In the carrier aggregation, a primary cell (PCell) is the L-Cell and a secondary cell (SCell) is the U-Cell.

In the case of transmitting a signal by using the unlicensed band in the network of the provider A, by law, it is defined that a Listen before Talk (LBT) scheme using carrier sensing is based before transmission of the signal, in order to avoid effect on communication in the provider B, the Wi-Fi, or the like.

Hereinafter, a description will be given of a communication control method using carrier sensing based on the LBT scheme to realize carrier aggregation using the unlicensed band according to the first embodiment and the second embodiment. Specifically, the communication control method will be described which enables synchronization between the U-Cell and the UE 100 using carrier sensing based on the LBT scheme.

(Functional Block)

(UE)

Figure 6:
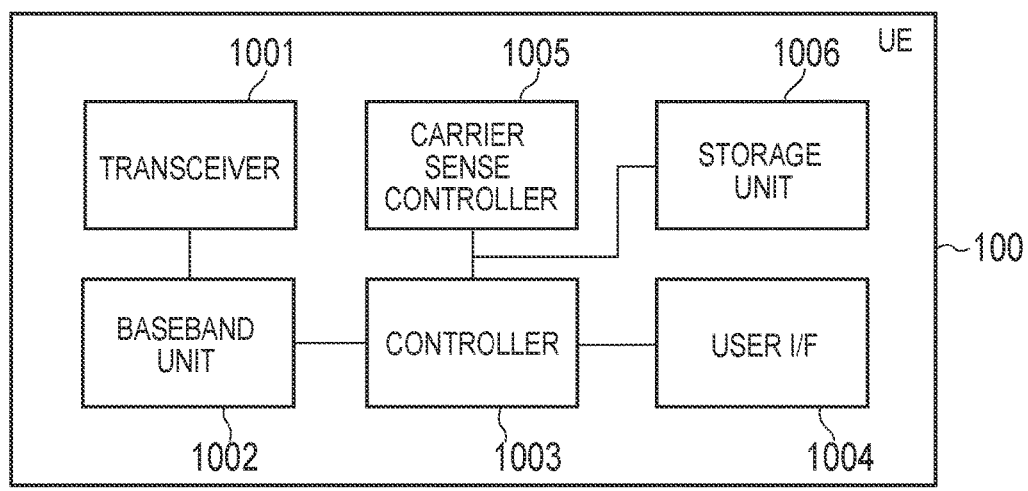
FIG. 6 is a functional block diagram of a UE according to the first embodiment.

FIG. 6 is a functional block diagram of a UE 100 according to the first embodiment. The UE 100 includes a transceiver 1001, a baseband unit 1002, a controller 1003, a user interface (I/F) 1004, a carrier sense controller 1005, and a storage unit 1006. Also, the carrier sense controller 1005 may be included only in the case of performing uplink transmission through the U-Cell as in a modification of the first embodiment and a modification of the second embodiment, which will be described below.

In the case of downlink data, a radio frequency signal received by the antenna 101 is amplified by an amplifier and is subjected to frequency conversion to be converted into a baseband signal in the transceiver 1001. The baseband unit 1002 performs Fast Fourier Transform (FFT) processing or error correction decoding, reception processing of retransmission control, or the like on the baseband signal.

In the case of uplink data, the baseband unit 1002 performs mapping processing, HARQ transmission processing or channel coding, DFT processing, or Inverse Fast Fourier Transform (IFFT) processing. The transceiver 1001 converts the baseband signal output from the baseband unit 1002 into a radio frequency band signal. Then, the radio frequency band signal is amplified by the amplifier and is transmitted by the antenna 101.

The controller 1003 is realized by the processor 160 and controls respective functions of the UE 100. For example, the controller 1003 receives radio resource information allocated by the eNB 200 and stores the radio resource information in the storage unit 1006. The controller 1003 reads the radio resource information from the storage unit 1006 and performs transmission/reception control. The controller 1003 controls a detection operation of a synchronization signal from the eNB 200, which will be described below.

The user I/F 1004, which is realized by a user interface 120, receives an input from a user and performs display output of information to the user.

The carrier sense controller 1005 is realized by the processor 160. Based on a carrier sense instruction performed by the eNB 200, the carrier sense controller 1005 performs control so as to perform carrier sensing with respect to a carrier specified by the instruction.

The storage unit 1006 is realized by the memory 150, and stores a variety of information, such as the radio resource information.

(eNB)

Figure 7:
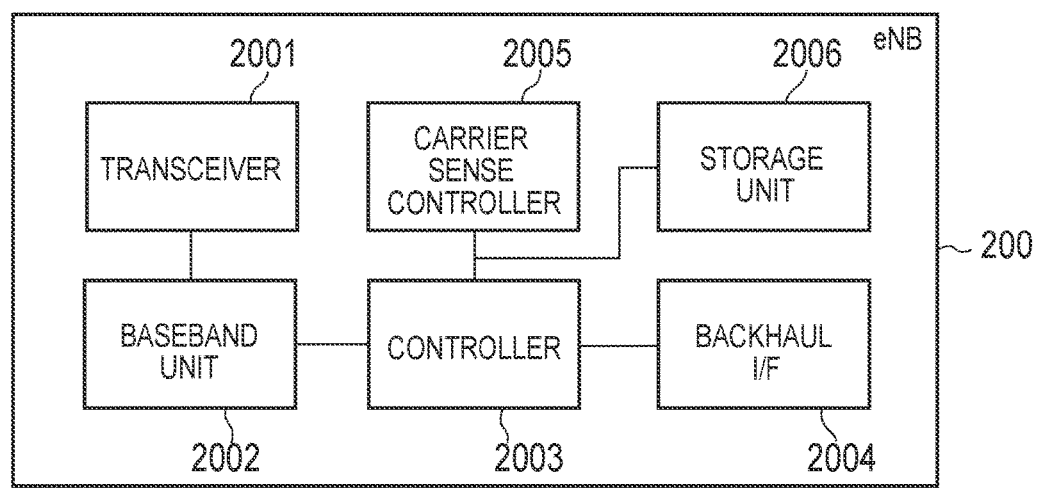
FIG. 7 is a functional block diagram of an eNB according to the first embodiment.

FIG. 7 is a functional block diagram of an eNB 200 according to the first embodiment. The eNB 200 includes a transceiver 2001, a baseband unit 2002, a controller 2003, a backhaul interface (I/F) 2004, a carrier sense controller 2005, and a storage unit 2006.

Downlink data to be transmitted from the eNB 200 to the UE 100 is input to the baseband unit 2002 through the backhaul I/F 2004 from an upper-level station located above the eNB 200, for example, an S-GW 300.

The baseband unit 2002 performs segmentation and concatenation of packet data, transmission processing of an RLC layer, such as transmission processing of RLC retransmission control, MAC retransmission control, for example, HARQ transmission processing, scheduling, transmission format selection, channel coding, IFFT processing, and performs transmission to the transceiver 2001. Also, the baseband unit 2002 performs generation processing of a synchronization signal. The synchronization signal is multiplexed to packet data and is transmitted to the transceiver 2001.

The transceiver 2001 performs frequency conversion processing of converting a baseband signal, which is output from the baseband unit 2002, into a radio frequency band signal, and the radio frequency band signal is amplified by the amplifier and is transmitted from the antenna 201. In this case, as the baseband signal, there are packet data, a synchronization signal, and the like.

In the case of the uplink data which is transmitted from the UE 100 to the eNB 200, the radio frequency signal transmitted by the antenna 201 is amplified by the amplifier, is subjected to frequency conversion by the transceiver 2001, and is input to the baseband unit 2002.

The baseband unit 2002 performs FFT processing, error correction decoding, reception processing of MAC retransmission control, and reception processing of an RLC layer on the input baseband signal, and the input baseband signal is transmitted to, for example, the S-GW 300, through the backhaul I/F 2004.

The controller 2003 is realized by the processor 240, and controls respective functions of the eNB 200. The controller 2003 performs, for example, state management of the eNB 200 or radio resource allocation. The controller 2003 performs control related to an instruction of a synchronization signal detection operation which is performed by the UE 100 and a carrier sense instruction, with respect to the UE 100.

The backhaul I/F 2004 is realized by the network interface 220, and is connected to a neighboring eNB 200 through an X2 interface and to the MME/S-GW 300 through the an S1 interface.

The carrier sense controller 2005 is realized by the processor 240, and determines whether to perform carrier sensing, based on a radio resource status of a cell.

The storage unit 2006 is realized by the memory 230, and stores information used for processing by the controller 2003.

First Embodiment

Figure 8:
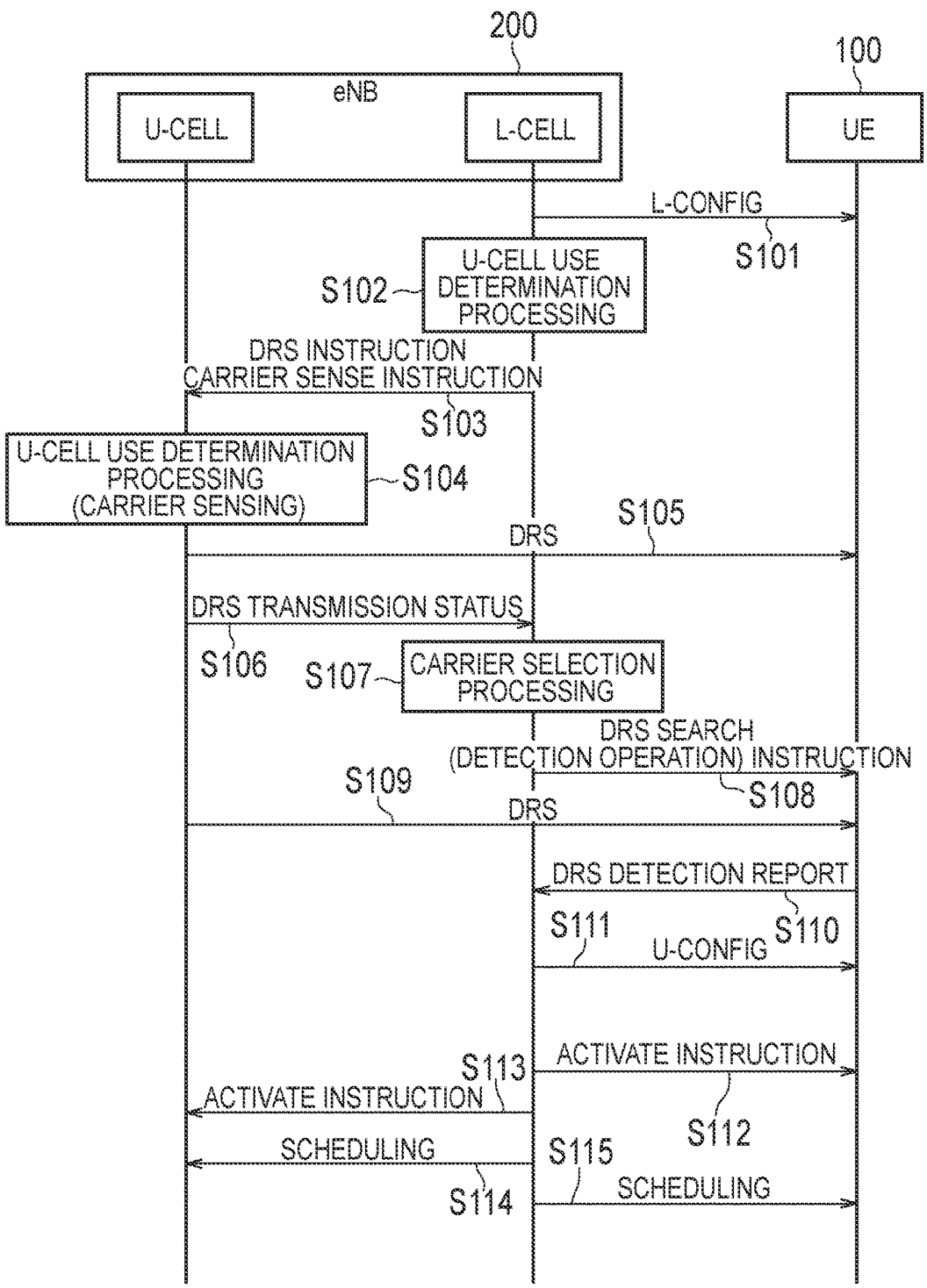
FIG. 8 is a sequence diagram illustrating an example of an operation sequence until a UE receives data using an unlicensed band according to the first embodiment.

FIG. 8 is a sequence diagram illustrating an example of an operation sequence until the UE 100 receives data using an unlicensed band according to the first embodiment. The eNB 200 of FIG. 8 manages an L-Cell to which a licensed band is allocated and a U-Cell to which an unlicensed band is allocated. The UE 100 is located under the L-Cell. Also, in FIG. 8, the sequence between the L-Cell and the U-Cell shows internal signals (internal messages) of the eNB 200.

In step S101, the eNB 200 transmits configuration information (L-config) of the L-Cell to the UE 100 through the L-Cell. Transmission of the L-config through the L-Cell by the eNB 200 is performed based on the conventional LTE specification.

In step S102, the eNB 200 determines whether to use the U-Cell, that is, whether to perform carrier sensing in the U-Cell, based on the radio resource status of the L-Cell. The radio resource status is, for example, a congestion degree of the L-Cell. In a case where the congestion degree exceeds a predetermined threshold value, it is determined to use the U-Cell. As the predetermined threshold value of the congestion degree, a common parameter between operators may be used, and information on the congestion degree in the LAN/RAN may be exchanged between the operators. Also, the radio resource status may be, for example, a traffic status of the L-Cell.

In step S103, when it is determined to use the U-Cell in step S102, the eNB 200 performs a transmission instruction of a discovery signal (DRS) through the U-cell and a carrier sense instruction on the U-Cell.

A reference signal and a synchronization signal are collectively referred to as a DRS. The DRS is a signal used for synchronization between a cell and the UE 100 and channel quality estimation. The DRS includes at least one of the reference signal and the synchronization signal as described below. The reference signal includes one or more of a reference signal (RS), a demodulation reference signal (DMRS), and a channel state information RS (CSI-RS). The synchronization signal includes a primary synchronization signal (PSS) and a secondary synchronization signal (SSS).

A transmission interval between the reference signal, the synchronization signal, and a control signal may be a transmission interval based on LTE Release 8, a long transmission interval specified for a small cell in LTE Release 12, or a newly-defined transmission interval.

The carrier sense instruction in step S103 may be designated to perform carrier sensing on partial or all carriers of the unlicensed band. The unlicensed band is divided into a plurality of small frequency bands (for example, a band of 20 MHz), and it is possible to select whether to use each of the small frequency bands. The small frequency band corresponds to one carrier (component carrier (CC)).

In step S104, when receiving the DRS instruction and the carrier sense instruction from the L-Cell, the eNB 200 performs carrier sensing on a carrier designated by the carrier sense instruction in the U-Cell and determines whether to use the designated carrier (U-Cell use determination processing). The U-Cell use determination processing in step S104 is continuously performed until a request to stop the DRS instruction and the carrier sense instruction is received from the L-Cell.

The U-Cell use determination processing is to determine that it is not available when, for example, a power averagely exceeds a reference value over the unlicensed band, determine that it is not available when a power exceeds the reference value for any one of small bands into which the unlicensed band is divided, and determine that it is not available when a power at a predetermined sequence exceeds the reference value. Such a determination is performed at a predetermined time or randomly. Also, the maximum power available by carrier sensing in determination may be determined.

In step S105, the eNB 200 selects at least one carrier among carriers determined as being available as a result of carrier sensing. The eNB 200 transmits a DRS used for synchronization between the U-Cell and the UE 100 through the U-Cell by the selected carrier. The transmission of the DRS may be controlled so as to avoid collision of data by performing synchronization with another base station (eNB or WLAN AP).

A transmission timing of the DRS may be a constant period, a timing obtained by adding a predetermined time perturbation (Ntime_pertubation) to the constant period, or a timing obtained by adding a predetermined time perturbation in addition to the transmission of the constant period. The predetermined time perturbation may be generated by using one or multiple of, for example, a PLMN (Public Land Mobile Network) ID, a MCC (Mobile Country Code), an MNC (Mobile Network Code), an SFN (System Frame Number), an SN (Slot Number), a PCI (Physical Cell ID), and the like. In a case where temporal synchronization between the L-Cell and the U-Cell is performed, the SFN and the SN may be used with a frame timing of the L-Cell set as a reference. The predetermined time perturbation may be calculated based on, for example, the following Formula.

$N_{time\_perturbation}=(c(2) \times 2^2 + c(1) \times 2 + c(0))-3$ [subframe] or [OFDMsymbol]

$c(n)=(x_1(n+Nc)+x_2(n+N_c))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ $N_c=1600$ $x_1(0)=1$ $x_1(n)=0, n=1,2,\ldots,30$ $C_{init}=\text{PLMNID} \times 2^7 + ((\text{SFN}) \bmod (2^3)) \times 2^4 + \text{floor}(\text{SN}/2) = x_2(0) \times 2^0 + x_2(1) \times 2^1 + \ldots + x_2(30) \times 2^{30}$ Thereby, it is possible to suppress collision of the DRS even when a plurality of U-Cells exist together within a neighboring area.

A transmission frequency resource of the DRS may be transmitted in a fixed frequency resource, may be transmitted in a frequency resource obtained by adding a predetermined frequency perturbation (Nfrequency_perturbation) to the fixed frequency resource, or may be transmitted in a frequency resource obtained by further adding a predetermined frequency perturbation in addition to transmission of the fixed frequency resource.

In this case, in addition to the DRS, broadcast information (notification information to another operator) may be transmitted by a physical broadcast channel (PBCH). The PBCH may include information related to the DRS (transmission interval, timing, or the like) or may include information corresponding to a reservation channel as described below (second embodiment) at the time of data transmission.

In step S106, the eNB 200 periodically or non-periodically notifies a transmission status of the DRS (DRS transmission status) of the U-Cell to the L-Cell. The DRS transmission status represents a result of carrier sensing for each of carriers of the unlicensed band. The result of carrier sensing may include information, such as information indicating stop of DRS transmission or start information, with respect to each carrier. When it is determined that the carrier is unavailable, for example, as a result of carrier sensing in the U-Cell, DRS transmission is stopped through the carrier, which is determined as being available, and the DRS transmission status indicating that the DRS transmission is stopped is notified to the L-Cell. Also, when it is determined that the carrier is available, for example, as a result of carrier sensing in the U-Cell, DRS transmission to the UE 100 is started, and the DRS transmission status indicating a carrier used for the DRS transmission is notified. When the DRS transmission status of the U-Cell is non-periodically notified to the L-Cell, a notification trigger of the transmission status may be a notification request for the DRS transmission status from the L-Cell or a change in the DRS transmission status.

In step S107, the eNB 200 selects a carrier to be used among the unlicensed band, based on the DRS transmission status from the U-Cell.

In step S108, the eNB 200 provides a search (detection operation) instruction for searching a DRS with respect to all or part of a selected carrier to the UE 100 through the L-Cell. The DRS search instruction may include a transmission timing of the DRS with, for example, a frame timing of the L-Cell set as a reference, a transmission power, a PSS/SSS sequence, a PCI, or the like.

In step S109, the eNB 200 transmits the DRS by at least one carrier selected from the unlicensed band at a predetermined period or non-periodically.

In step S110, the UE 100 performs search (detection operation) on all or part of the carrier, based on the search instruction through the L-Cell from the eNB 200. The UE 100 transmits a detection report indicating a result of the DRS search (detection operation) to the eNB 200 through the L-Cell. The DRS detection report may include a reception power of the DRS, a path loss estimation result from the U-Cell, or the like. A transmission trigger of the DRS detection report may be activated after reception of a transmission request for the DRS detection report, which is transmitted through the L-Cell, or the DRS detection report may be periodically transmitted after reception of the DRS search instruction.

In step S111, the eNB 200 determines a carrier available by the UE 100 among the unlicensed band based on the DRS detection report received through the L-Cell. In the present embodiment, the available carrier is used for carrier aggregation. The eNB 200 transmits configuration information (U-Config) of the U-Cell including a carrier available for carrier aggregation to the UE 100 through the L-Cell. The U-Config is transmitted at an arbitrary timing between the carrier selection processing (step S107) and an activate instruction (step S112) which will be described below.

In step S112, when data to be transmitted to the UE 100 is generated, the eNB 200 transmits the activate instruction to the UE 100 through the L-Cell.

In step S113, the eNB 200 performs the activate instruction to the U-Cell.

In step S114, the eNB 200 performs scheduling on the U-Cell. Scheduling information for performing scheduling may be notified along with the activate instruction or may be notified separately from the activate instruction.

In step S115, the eNB 200 transmits the scheduling information of the U-Cell to the UE 100 through the L-Cell. The scheduling information may be transmitted through the U-Cell, rather than through the L-Cell.

The UE 100 is capable of receiving data by a carrier of the unlicensed band by using the received scheduling information. That is, the UE 100 and the eNB 200 can communicate with each other by carrier aggregation using a carrier of a licensed band and the carrier of the unlicensed band.

As described above, according to the first embodiment, before using the unlicensed band, the eNB 200 performs carrier sensing based on the LBT scheme and transmits a synchronization signal by the carrier among the unlicensed band, which is selected based on a result of carrier sensing. The UE 100 performs the detection operation of the synchronization signal. Therefore, the synchronization between the U-Cell and the UE 100 is possible and it is possible to realize carrier aggregation using the carrier of the unlicensed band.

Modification of First Embodiment

Figure 9:
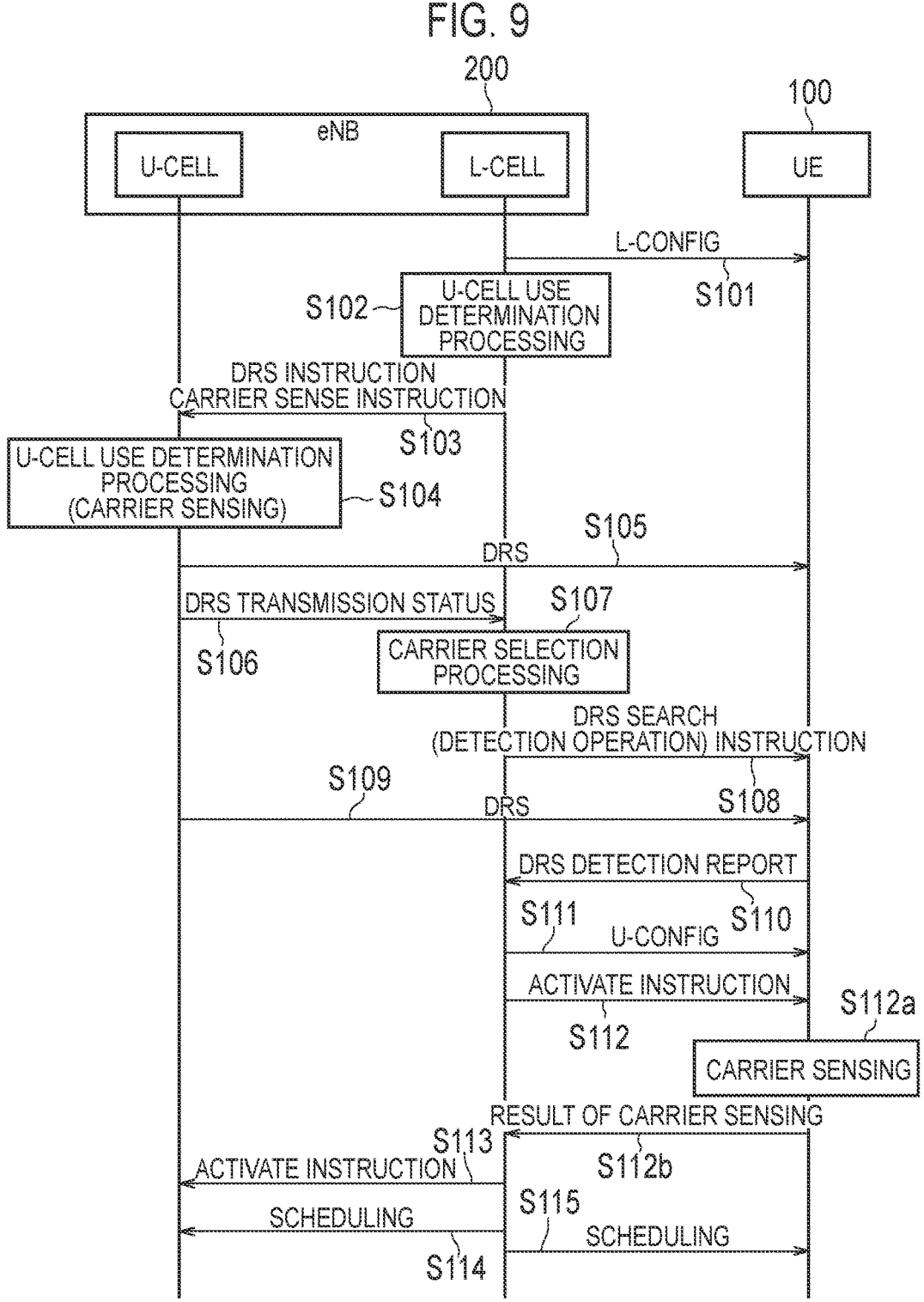
FIG. 9 is a sequence diagram illustrating an example of an operation sequence until a UE receives data using an unlicensed band according to a modification of the first embodiment.

In a modification of the first embodiment, the UE 100 may perform carrier sensing on carriers of an unlicensed band in the UE 100, in addition to the operation of the first embodiment illustrated in FIG. 9 as described above.

FIG. 9 is a sequence diagram illustrating an example of an operation sequence until the UE 100 receives data using an unlicensed band according to the modification of the first embodiment. In the modification of the first embodiment illustrated in FIG. 9, the same numerals are assigned to the same parts as the sequence of the first embodiment illustrated in FIG. 8, and a detailed description will be omitted. In the following description, a difference from the first embodiment will be mainly described.

In the modification of the first embodiment, the UE 100 receives an activate instruction in step S112, and thereafter, the UE 100 performs carrier sensing in step S112a. In an example of FIG. 9, the activate instruction includes a carrier sense instruction and information for specifying a carrier from an unlicensed band that is a target for carrier sensing. The UE 100 performs carrier sensing on the specified carrier which is included in the activate instruction.

In step S112b, the UE 100 transmits a result of carrier sensing to the eNB 200 through the L-Cell.

Also, a timing at which the UE 100 performs carrier sensing is not limited to a timing after the activate instruction illustrated in FIG. 9. The timing at which the UE 100 performs carrier sensing may be, for example, after reception of a DRS search instruction (step S108) or after reception of the U-config (step S111). In this case, the DRS search instruction or the U-config includes a carrier sense instruction and information for specifying a carrier from an unlicensed band that is a target for carrier sensing.

Also, the carrier sense instruction may be defined as a new signal. In this case, the eNB 200 transmits the activate instruction to the UE 100 through the L-Cell after step S108, step S111, and step S112.

The eNB 200 removes a carrier in use among the unlicensed band based on a result of carrier sensing which is received from the UE 100 through the L-Cell, and performs subsequent processing.

As described above, according to the modification of the first embodiment, it is possible to detect a use status from another cell and the UE 100, which are using the same carrier of the unlicensed band, by performing carrier sensing in the UE 100. When the UE 100 receives data using an unlicensed band, the eNB 200 can select a carrier which has little effect on another cell, based on the result of carrier sensing.

Second Embodiment

Figure 10:
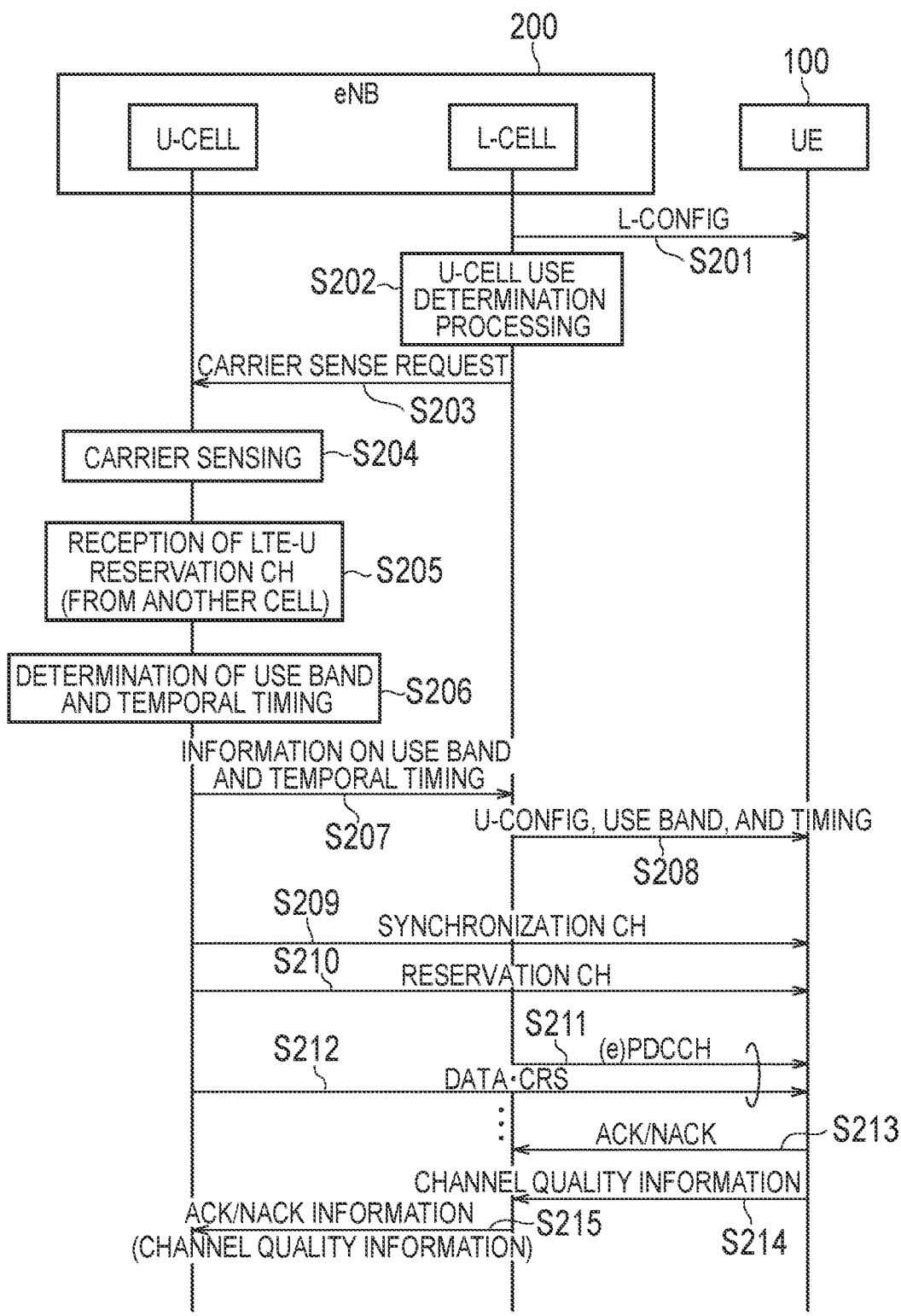
FIG. 10 is a sequence diagram illustrating an example of an operation sequence until a UE receives data using an unlicensed band according to the second embodiment.

FIG. 10 is a sequence diagram illustrating an example of an operation sequence until the UE 100 receives data using an unlicensed band according to a second embodiment. The eNB 200 of FIG. 10 manages an L-Cell to which a licensed band is allocated and a U-Cell to which an unlicensed band is allocated. The UE 100 is located under the L-Cell. Also, in FIG. 10, the sequence between the L-Cell and the U-Cell shows an internal signal (internal message) of the eNB 200.

Step S201 and step S202 respectively correspond to step S101 and step S102 illustrated in FIG. 8.

When it is determined to use the U-Cell in step S202, the eNB 200 transmits a carrier sense request for performing carrier sensing to the U-Cell in step S203.

In step S204, the eNB 200 performs carrier sensing on the U-Cell based on the carrier sense request. The eNB 200 determines one or more carriers suitable for communication with UE 100 among the unlicensed band through carrier sensing. Specifically, a rate in which the a reception intensity of a measurement target carrier is equal to or less than a threshold value is calculated, for example, during a measurement period by carrier sensing. When the calculated rate is equal to or less than a predetermined rate, the measurement target carrier is determined as a carrier suitable for communication with the UE 100.

In step S205, the eNB 200 detects a reservation channel transmitted by another U-Cell with respect to a carrier determined based on a result of carrier sensing. The reservation channel is a channel for transmitting information, such as a length of a subframe occupied by a carrier among the unlicensed band, to another carrier U-Cell. The reservation channel may be secured as a channel, or information, such as a length of the occupied subframe, may be transmitted by using an ID of PSS and SSS.

Information included in the reservation channel includes, for example, information of a length of data subsequent to the reservation channel, information on a transmission timing of subsequent data, a data transmission period, an offset amount from a timing reference, such as DRS, the number of UEs capable of being accommodated, a bandwidth, information on a band occupied besides the band, and information on a band occupancy rate. By searching the reservation channel, timing information at which a channel used in the unlicensed band is empty, or the like is specified.

In step S206, the eNB 200 determines a band to be used (carrier) among the unlicensed band and a temporal timing in the band to be used, based on the carrier determined by carrier sensing and information on the reservation channel transmitted in the another U-Cell. Also, determination of a carrier to be used among the unlicensed band and a temporal timing in the carrier to be used may be performed by using information, such as an amount of data scheduled to be transmitted using the unlicensed band. By receiving the reservation channel, it is possible to detect a temporal timing of transmission completion by the U-Cell which transmits the reservation channel. Therefore, it is possible to set a timing immediately after the temporal timing as a timing of a host station. Also, the use band may be updated at a predetermined period.

In step S207, the eNB 200 notifies the L-Cell of the band to be used (use band) and the temporal timing information, which are determined in the U-Cell.

In step S208, the eNB 200 notifies the UE 100 of configuration information, the use band, and the temporal timing information of the U-Cell through the L-Cell.

In step S209, the eNB 200 transmits a synchronization signal (synchronization channel) through the U-Cell.

In step S210, the eNB 200 transmits the reservation channel through the U-Cell.

Also, the eNB 200 transmits one or more signals of the synchronization signal, the reservation channel, a data signal, and a reference signal through the U-Cell. The signals may be simultaneously transmitted within one subframe, or may be transmitted through a plurality of subframes. Also, whether to transmit the reservation channel may be arbitrarily determined.

In step S211, the eNB 200 transmits allocation information of radio resources in the U-Cell by (e) PDCCH to the UE 100 through the L-Cell. The allocation information of radio resources in the U-Cell is transmitted at a timing before or at the same timing as a transmission timing of data of the U-Cell in step S212 which will be described below.

Also, when a transmission destination of data transmitted through the U-Cell is a single UE 100, and a band allocated to the UE 100 can be determined, the allocation information may be included in the reservation channel or the U-config and transmission of (e) PDCCH through the L-Cell may not be performed.

Also, with respect to the allocation information of radio resources by (e) PDCCH, there may occur a case in which the UE 100 to which the radio resources are allocated after transmission of the synchronization signal cannot be synchronized. Therefore, it may be configured such that the allocation information of radio resources to each UE 100 within a data area is included in the reservation channel, rather than that the allocation information of radio resources is included in (e) PDCCH. Also, cross-carrier and cross-subframe scheduling by (e) PDDCH is performed, and radio resources may be designated by performing allocation to the UE before the synchronization signal.

In step S212, the eNB 200 transmits data through the U-Cell. The UE 100 transmits the data transmitted through the U-Cell according to the allocation information.

In step S213, after transmission of the data, the UE 100 transmits a confirmation response (ACK/NACK) to the eNB 200 through the L-Cell.

In step S214, channel quality information is measured from data of the reference signal and the channel quality information is transmitted to the eNB 200 through the L-Cell. For example, the channel quality information may be CQI, RSRP, or the like. The channel quality information may be transmitted simultaneously with the confirmation response.

In step S215, the eNB 200 notifies the U-Cell of the confirmation response received through the L-Cell.

Also, the reservation channel is not limited to downlink transmission, and may be applied to an uplink when uplink transmission is possible. When the reservation channel is applied to the uplink, for example, a subframe is occupied by a single user.

A timing at which the UE 100 receives data from the U-Cell may be notified to the UE 100 in advance by using a start subframe of synchronization, that is, (e) PDCCH or the like through the L-Cell. Also, since occurrence of WiFi interruption is considered when time has been lapsed after the instruction, it is preferable to perform transmission just before. Also, after the UE 100 receives (e) PDCCH, the UE 100 continuously receives data through the U-Cell during a predetermined window size.

Figure 11:
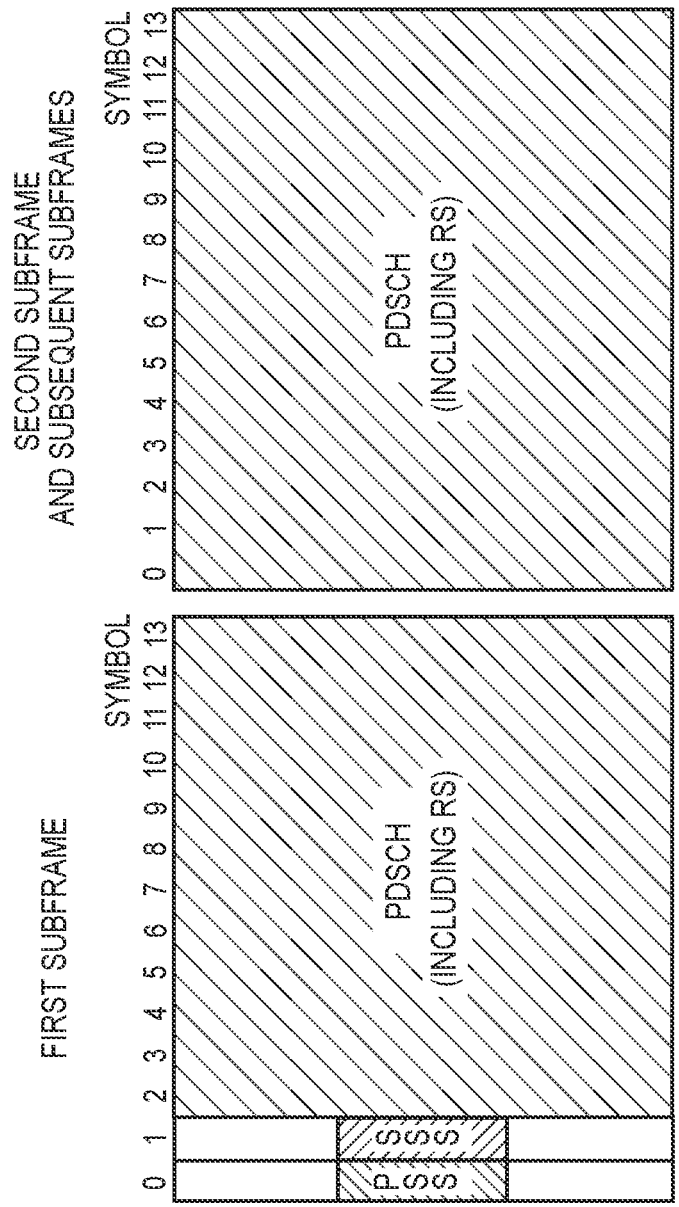
FIG. 11 is a diagram illustrating an example of a format of a subframe transmitted from an eNB through a U-Cell according to the second embodiment.

FIG. 11 is a diagram illustrating an example of a format of a subframe transmitted from the eNB 200 through the U-Cell according to the second embodiment.

As illustrated in FIG. 11, a synchronization signal (PSS/SSS) is transmitted in the head of a first subframe and thereafter, user data (physical downlink shared channel (PDSCH)) is transmitted. Also, the PSS/SSS is not limited to be placed within the subframe, and may be transmitted in a burst before communication is started. It is unnecessary to transmit the synchronization signal after the second subframe and transmission of data is continuously performed after the second subframe. At the time of data transmission, the reference signal (RS) is simultaneously transmitted. The UE 100 can perform decoding by the reference signal and measurement of channel quality. The synchronization signal (PSS/SSS) is a synchronization signal used for synchronization between the U-Cell and the UE 100.

In this way, according to the second embodiment, the synchronization signal used for synchronization between the U-Cell and the UE 100 and user data, which are included in the same subframe by the carrier among the unlicensed band, are transmitted in a time division manner.

Figure 12:
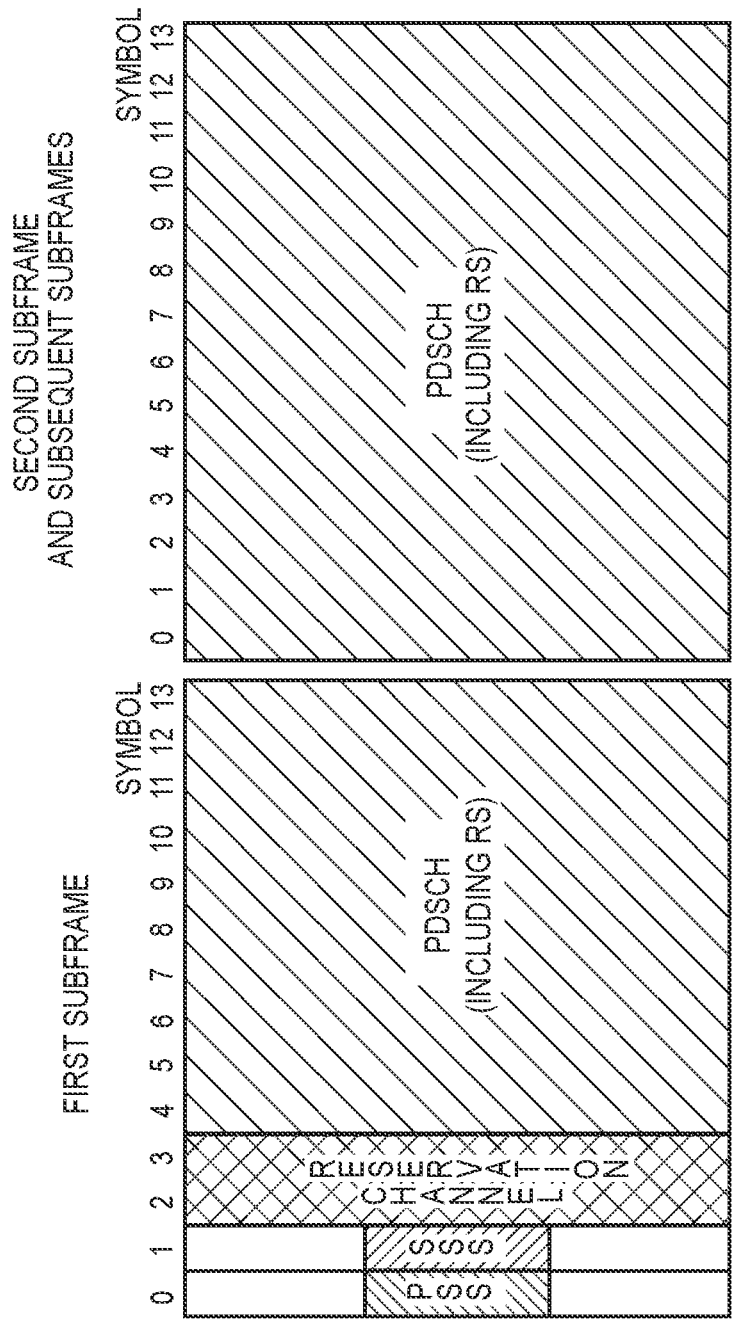
FIG. 12 is a diagram illustrating another example of a format of a subframe transmitted from an eNB through the U-Cell according to the second embodiment.

FIG. 12 is a diagram illustrating another example of a format of a subframe transmitted from the eNB 200 through the U-Cell according to the second embodiment.

A subframe format of FIG. 12 differs from that of FIG. 11 in that a reservation channel is transmitted in a first subframe. The reservation channel includes one or more of a length of ON, a cycle and an offset, information on an occupancy rate, such as an ON/OFF ratio, the number of UEs capable of being accommodated, a bandwidth, and total bandwidth information. Before carrier sensing is performed in the U-Cell of a host station, the eNB 200 which manages another U-Cell determines a use bandwidth and a temporal timing in the U-Cell of the host station by receiving the reservation channel. Therefore, according to completion of data transmission/reception in the another U-Cell, data transmission/reception in the use band of its own U-Cell can be started. Also, a non-communication period is reduced, and efficient use of the band is possible.

Also, whole or partial information of the reservation channel received by the UE 100 may be notified to an L-Cell connected to the UE 100. In this case, the eNB 200 may determine the use band and the temporal timing in the U-Cell by using information of the reservation channel received by the UE 100. The reservation channel includes an identifier for identifying the U-Cell to which it is transmitted. The UE 100 may identify a reservation channel from a U-Cell which is connected thereto and a reservation channel from a U-Cell which is not connected thereto, based on the identifier of the U-Cell, and determine to notify the reservation channel.

In this way, according to the second embodiment, the synchronization signal used for synchronization between the U-Cell and the UE 100, user data, and the reservation channel, which are included in the same subframe by the carrier among the unlicensed band, are transmitted in a time division manner.

Also, the configuration of the subframe may be controlled based on the occupancy rate of the unlicensed band. For example, when the occupancy rate in the unlicensed band is less than a predetermined threshold value, use of the subframe is not allowed, and the user data may be packed into a front subframe, thereby reducing the number of occupied subframes. Also, when an occupied band of the unlicensed band is large, control may be performed to shorten an occupancy time.

In the second embodiment, there may be a configuration in which a timing of the head of a subframe of a licensed band is not matched with a transmission start timing of a subframe of an unlicensed band, and the eNB 200 can finely adjust the transmission timing. For example, when the timing is deviated within 0.5 msec, it is possible to perform control to change the transmission start timing at each transmission opportunity in consideration of confliction of Wi-Fi or the like. A basic unit of Wi-Fi is finer than that of LTE, thereby making fine adjustment efficient.

Also, in the second embodiment, when a timing deviation between the U-Cell and the licensed cell is allowed, there is a case where a subframe number of the unlicensed band is unclear and a timing of Ack/Nack which the UE 100 transmits through the L-Cell are not known. In order to respond those mentioned above, the subframe number may be included in the reservation channel or may be shared with the L-Cell within a range of ±0.5 msec.

Also, the synchronization signal (PSS/SSS) in FIGS. 11 and 12 is not limited to a configuration in which the synchronization signal is transmitted only in the head of the subframe, and may be transmitted periodically.

Modification of Second Embodiment

According to a modification of the second embodiment, when uplink communication is performed in addition to downlink communication, a random access preamble is transmitted from the UE 100, in addition to the operation of the second embodiment illustrated in FIG. 10 as described above.

Figure 13:
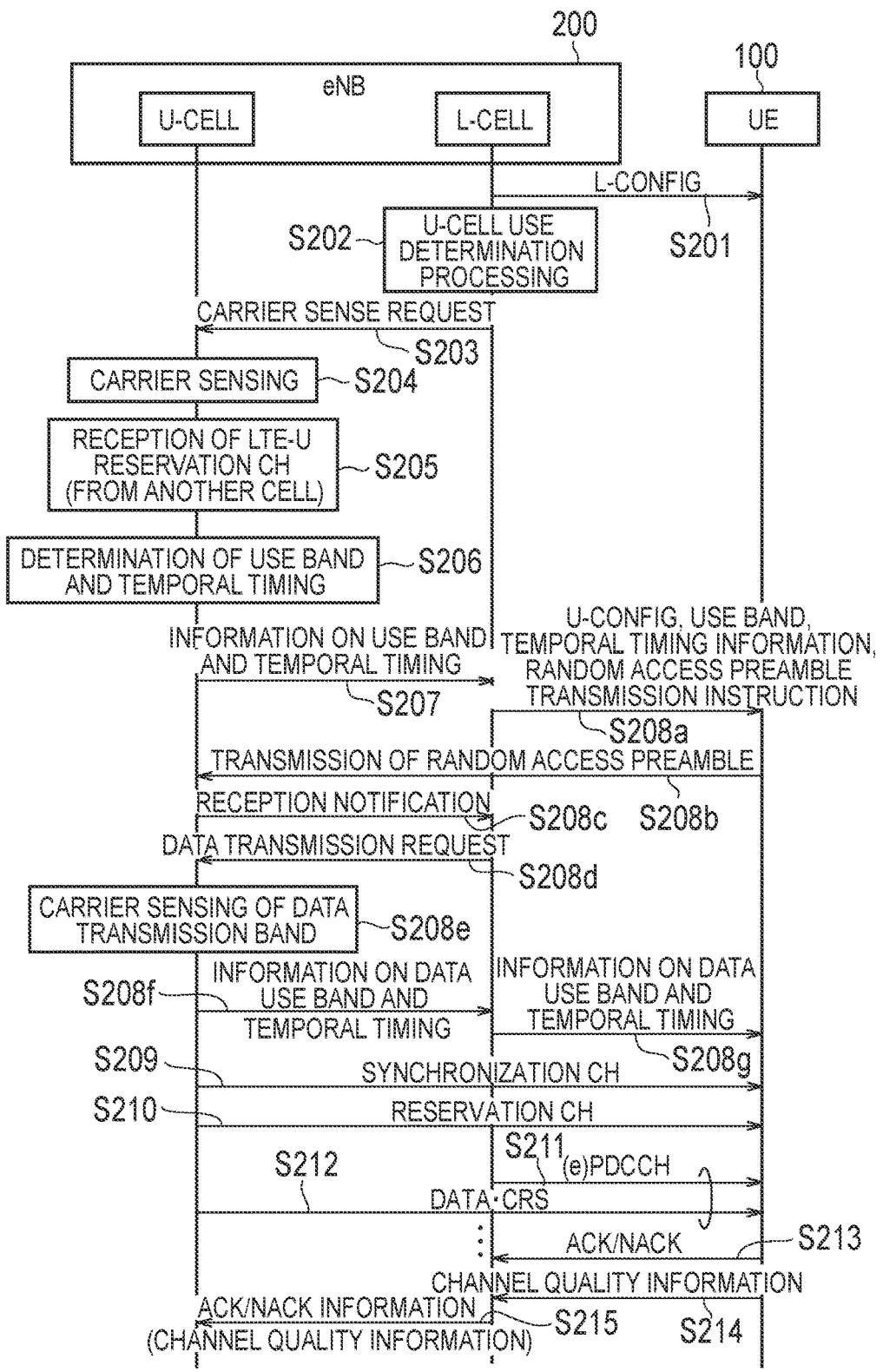
FIG. 13 is a sequence diagram illustrating an example of an operation sequence until a UE receives data using an unlicensed band according to a modification of the second embodiment.

FIG. 13 is a sequence diagram illustrating an example of an operation sequence until the UE 100 receives data using an unlicensed band according to the modification of the second embodiment. Among the sequence according to the modification of the second embodiment illustrated in FIG. 13, the same numerals are assigned to the same sequence as the second embodiment illustrated in FIG. 10, and a detailed description will be omitted. In the following description, a difference from the second embodiment will be mainly described.

In step S208*a*, the eNB 200 transmits a random access preamble transmission instruction to the UE 100 through the L-Cell, the random access preamble transmission instruction including the U-config, a use band in the U-Cell, a temporal timing, and configuration information of a preamble sequence for the U-Cell.

Also, in step S208*a*, when the unlicensed band includes a plurality of carriers (for example, a case where three bandwidths of 20 MHz are included), a plurality of pieces of preamble sequence configuration information for the respective carriers may be transmitted (for example, as a list). In this case, the UE 100 performs RACH transmission by using a plurality of bands designated, based on random access channel (RACH) information notified by a PBCH or a PDSCH through the L-Cell. In this case, transmission powers in initial transmissions of bands are almost the same as one another. Therefore, it is possible to accelerate processing of selecting a communicable unlicensed band.

In step S208*b*, the UE 100 transmits the random access preamble to the eNB 200 through the U-Cell, based on the random access preamble transmission instruction.

Also, the UE 100 may perform carrier sensing on the use band (carrier), and only when it is determined that the use band is available, transmit the random access preamble. Also, when performing carrier sensing before transmission of the random access preamble, the UE 100 may further transmit information indicating a valid time of carrier sensing to the UE 100 in step S208*a*. The UE 100 performs carrier sensing based on the information indicating the valid time of carrier sensing when the valid time of carrier sensing has elapsed (a timer of the carrier sensing valid time expires) after previous carrier sensing is performed. When the valid time of carrier sensing has not elapsed (the timer of the carrier sensing valid time does not expire) after previous carrier sensing is performed, carrier sensing is not performed until the valid time of carrier sensing has elapsed. Therefore, it is possible to omit unnecessary carrier sensing operation in the UE 100, suppress power consumption, and minimize a delay until start of communication.

On the other hand, when it is determined that the use band of a carrier sensing target is unavailable as a result of carrier sensing, the UE 100 performs carrier sensing on another user band. When it is determined that the another use band is available, the UE 100 transmits the random access preamble. Also, when the UE 100 receives configuration information of a plurality of pieces of preamble sequence configuration information in step S208*a*, transmission of the random access preamble may be performed such that a random access preamble for another use band is transmitted.

When receiving the random access preamble from the UE 100 through the U-Cell, the eNB 200 determines that interference does not occur in the UE 100 with respect to the use band.

In step S208*c*, the eNB 200 transmits, to the L-Cell, reception notification for the random access preamble through the U-Cell. Information included in the reception notification is, for example, an identifier which is unique to, for example, a preamble sequence or the UE 100.

Also, when receiving the random access preamble, the eNB 200 performs carrier sensing on the use band. After it is confirmed that interference does not occurs on the side of the eNB 200 (U-cell), the eNB 200 may transmit reception notification to the L-Cell.

Also, the eNB 200 may receive a result of carrier sensing in the U-Cell and the random access preamble simultaneously. In this case, temporal timing information notified in step S207 includes a timing at which carrier sensing is to be performed for each use band. In addition, a transmission band and a transmission timing of the random access preamble, which are included in the preamble sequence configuration information transmitted in step S208a, are determined based on a timing at which carrier sensing is performed. Therefore, it is possible to minimize a delay until the UE 100 and the eNB 200 start data communication using the unlicensed band.

In step S208d, the eNB 200 determines whether data is received through the U-Cell by the UE 100 for the use band, and transmits a request for data transmission using the use band through which data is capable of being received from the L-Cell by the U-Cell. Also, information from the U-Cell may be stored in a memory used by the L-Cell for a predetermined time, and may be reused when communication again occurs.

Also, the request for the data transmission in step S208d may be performed before step S208b. In this case, information indicating whether to perform transmission for each subframe is determined in advance. In step S208g or step S211, the L-Cell of the eNB 200 performs allocation of resources for data by using a relevant subframe and a data transmission band determined in step S208b and S208e. Therefore, it is possible to minimize a delay until the UE 100 and the eNB 200 start data communication using the unlicensed band.

In step S208e, the eNB 200 performs carrier sensing on the data transmission band designated by the data transmission request and selects an available band (data use band) among the data transmission band. Also, When the eNB 200 simultaneously receives the result of carrier sensing in the U-Cell and the random access preamble as described above, the operation of step S208e may be omitted.

In step S208f, the eNB 200 notifies the data use band and the temporal timing from the U-Cell to the L-Cell based on the result of carrier sensing.

In step S208g, the eNB 200 transmits the data use band and the temporal timing to the UE 100 through the L-Cell.

Other Embodiments

In the aforementioned embodiments, there has been described an example in which the L-Cell and the U-Cell are managed by the same eNB 200, and carrier aggregation is applied to the L-Cell and the U-Cell. However, a configuration may be possible in which an eNB 200 managing the L-Cell is different from an eNB 200 managing the U-Cell. That is, the present application is applicable to dual connectivity communication using an unlicensed band.

[Additional Statement 1]
(1. Introduction)

With the increasing traffic demand in the wireless communication system, additional frequencies are needed to keep providing better QoS. The use of unlicensed spectrum by cellular operators is one of the options available to provide wireless services. A new Study Item on Licensed-Assisted Access (LAA) has been agreed. A study is required to determine a single global solution which enhances LTE to enable licensed-assisted access to unlicensed spectrum while coexisting with other technologies and fulfilling the regulatory requirements. Due to the limitation of Rel-13 time frame, studies of unlicensed spectrum must follow the following guidelines and assumptions:

Determine a single global solution framework for licensed-assisted access to unlicensed spectrum.
Dual Connectivity is not included in this SI.
A standalone access to unlicensed spectrum is not part of the study.
Focus on LTE Carrier Aggregation configurations and architecture where one or more low power Scell(s) (ie., based on regulatory power limits) operates in unlicensed spectrum and is either DL-only or contains UL and DL.
In LTE Carrier Aggregation, UEs are not supposed to receive the broadcast system information on the Scell.
Reuse the features and functionality of existing LTE design as much as possible.

In this additional statement, design targets and required functionalities of LAA using existing LTE design will be described.

(2. Design Targets)
High-Level Design of LTE Physical Layer

A straight forward way to enable licensed-assisted access to unlicensed spectrum is reusing the current LTE Physical Layer with extension and modifications to adapt various regulations in different countries or regions. Assuming this approach can keep the standardization effort to the minimum; however, we must ensure coexistence with the other already deployed unlicensed spectrum based technologies such as Wi-Fi. Another approach is to create a totally new LTE Physical Layer design (i.e., Further LTE Physical Layer Enhancements for unlicensed spectrum) with reusing the existing features as much as possible. This approach has a much better chance to get an effective LTE Physical Layer achieving a good harmonization with other unlicensed spectrum deployments. On the other hand, it may lose advantages of centrally-controlled system and may perform much worse than licensed LTE systems. Additionally, a brand new physical layer design could be very difficult to complete within Rel-13 time-frame. Therefore, we propose a LTE Physical Layer for unlicensed spectrum should be reuse the existing LTE Rel-12 design with extension to adapt regulations.

A Single Global Solution Framework

It is requested to determine a single global solution for LAA operation. Therefore, one unified LAA solution which can be meet the regulations for each country or region should be studied. Since the regulations of unlicensed spectrum are different in each country or region, it is required to design a system using the most stringent countries' and regions' regulations. E.g., Dynamic Frequency Selection (DFS), Transmit Power Control (TPC), Listen-Before-Talk (LBT) and burst transmission schemes must be considered to be incorporated to the existing physical layer design which enables LAA feature. FFS if the above features are mandatory or optional.

Coexistence with Other Unlicensed Spectrum Deployments

It is requested to define the design targets for coexistence with other unlicensed spectrum deployments. For the fairness coexistence with Wi-Fi, LAA should not impact Wi-Fi services. The fairness coexistence between different LAA operators and between LAA and other technologies in the same band is the design target as well.

(3. Necessary Enhancements)

In this section we discuss the necessary enhancements to achieve the above design targets from the perspective of regulations, coexistence with Wi-Fi, coexistence with other LAA services and Radio access.

1. Regulation

As we mentioned in section 2, DFS, TPC, LBT and LTE burst transmission will be required in some countries or regions for using unlicensed spectrums. Almost all countries have requirements related to DFS and TPC for some bands. Although, these features are not supported in the existing releases we should introduce them to meet the above requirements. In addition, LBT and Burst transmission are required in Europe and Japan, which should be introduced as well.

2. Coexistence with Wi-Fi

Comportment Carrier (CC) Bandwidth in Unlicensed Spectrum

5 GHz spectrum is divided per 20 MHz bandwidth for use in Wi-Fi. We think CC in unlicensed spectrum should be aligned with this bandwidth for better coexistence. Note that the maximum number of aggregated CC should be 5 regardless the CC is in licensed spectrum or unlicensed spectrum. It means, if needed, up to 4 CCs in unlicensed spectrum should be aggregated at same time.

Resource Occupancy in a CC/in a LTE Burst

Figure 14:
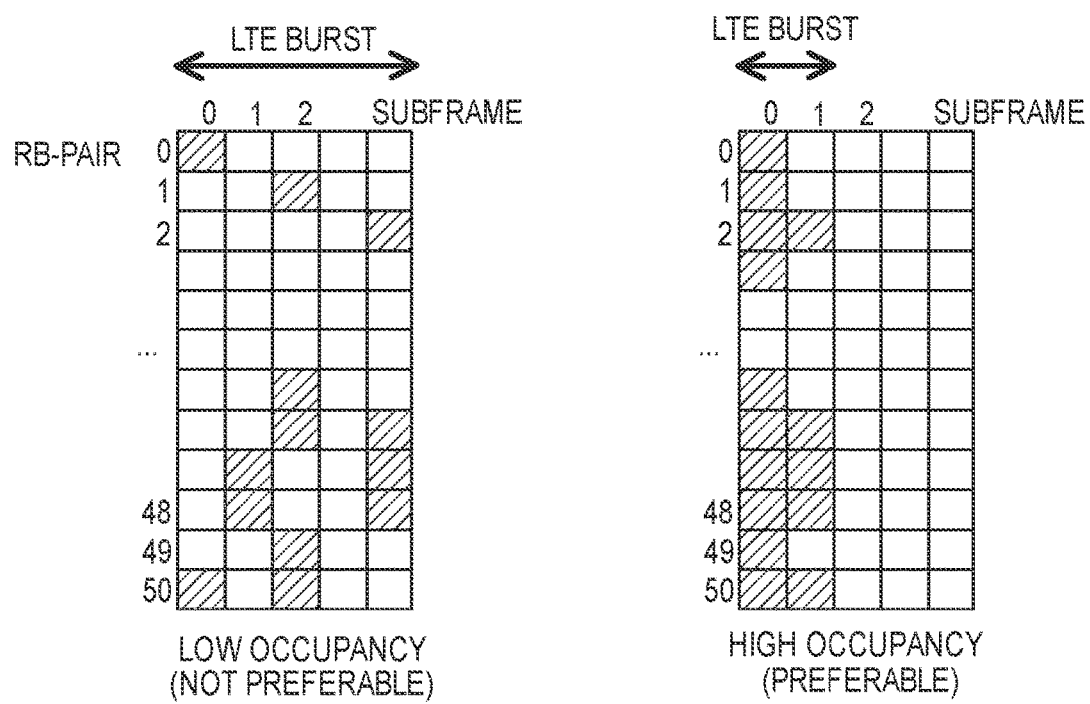
FIG. 14 is a diagram according to additional statement.

For achieving effective coexistence with Wi-Fi, Unlicensed spectrum should be used on an "on demand" basis. It's not a preferable situation that LTE use the unlicensed spectrum, but resource occupancy is quite low. (See the left figure of FIG. 14) Therefore it should be specified the minimum resource occupancy rule in a CC in unlicensed spectrum. Also even though during ON duration in unlicensed band's CC, it should be good to create short idle periods for LTE transmission (e.g., LTE Burst) to enable Wi-Fi to interrupt on a same resources. In that case, it should be specified the minimum resource occupancy rule in a LTE Burst in unlicensed spectrum as well.

3. Coexistence with Other LAA Services

PCI (Physical Cell ID) Collision Avoidance

Same PCI should not be allocated to neighbor cell. Within an operator's network, it can be achieved by cell planning or SON function. However, PCI collisions should be expected as the number of cells increases.

Same CC Sharing by More than One LAA Services

There is a situation that one CC is shared by more than one LAA service. In that case more tight coordination can be achieved than the Coexistence scenario between Wi-Fi and LAA services. Both time domain and frequency domain resource sharing can be considerable. Regarding the time domain resource sharing, periodic resource sharing or burst resource sharing should be considered.

4. Radio Access

Synchronization Between UE and Cell in Unlicensed Spectrum

If unlicensed spectrum is used on an "on demand" basis, it's reasonable to reuse DRS for synchronization.

Multi-Antenna Transmission Support and Related Feedbacks in Unlicensed Spectrum

For achieving maximum throughput, multi-antenna transmission should be supported in unlicensed spectrum band. We also believe beamforming based technologies can be effective by not causing unnecessary interference in unlicensed spectrum. To implement multi-antenna transmission technologies in unlicensed spectrum CSI information feedback should be considered.

HARQ Protocols

HARQ ACK/NACK transmission and corresponding retransmission should be modified if LTE Burst is applied. If unlicensed spectrum is used as UL transmission, it should be discussed if synchronous HARQ design can continue to be applied.

Scheduling and Necessary Feedbacks

Dynamic scheduling should be supported in unlicensed spectrum as same as in licensed spectrum. Both self-scheduling and cross carrier scheduling should be supported. If unlicensed spectrum is used on an "on demand" basis, some enhancement is needed for eNodeB to acquire necessary feedbacks from UE. Further study is needed if the existing PDCCH design is robust enough or not.

(4. Required Functionalities)

In this section, we discuss about required functionalities corresponding to potential issues described in section 3. Since high priority should be on the completion of the DL only scenario, we split the required functionalities for LAA between DL only (Tables 1 to 4) and UL specific (Table 5).

TABLE 1

Figure 15:
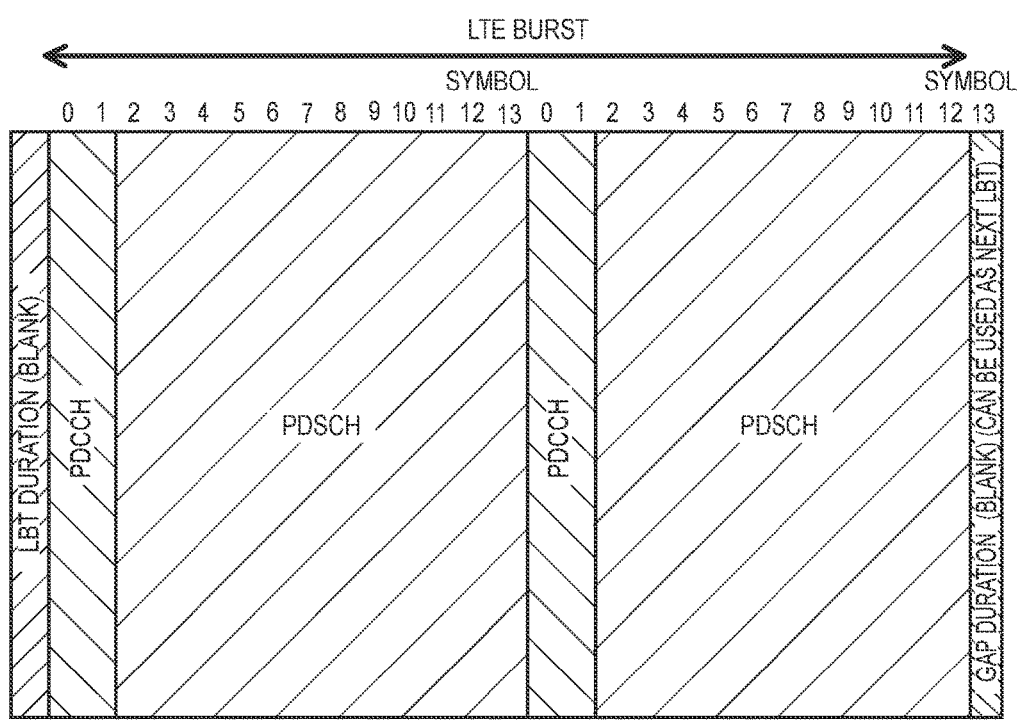
FIG. 15 is a diagram according to additional statement.

| Functionality | Description Regulation |
|---|---|
| DFS | Although DFS is a mandatory function for many countries or regions, for unlicensed spectrum usage thresholds for DFS requirements are not the same for each case. |
| LBT (eNodeB) | LBT is needed to meet regulations in Europe and Japan. As same as DFS, thresholds for LBT requirements are not the same for each case. If eNodeB detect higher interference than the threshold during LBT, eNodeB notice a follow-up transmission occasion cannot be used. FFS if gap for LBT should be created to keep the current structure or a new LTE Physical Layer is introduced. (One example of latter alternative is shown in FIG. 15.) |
| LBT (UE) | Similar to LBT (eNodeB). The LBT threshold values must be configurable by the network or the UE learns and adapts itself. |
| TPC | Further study is needed if any function should be standardized. |
| LTE Burst length (Channel Occupancy time/Max Burst Length) | This is needed to meet regulations in Europe and Japan. For achieving gap for LBT, LTE should be enhanced to support burst transmission. The Channel Occupancy time/Max Burst Length should be introduced. Note this is also helpful in coexistence with the Wi-Fi systems. |

TABLE 2

| Functionality | Description Coexistence with Wi-Fi |
|---|---|
| Resource occupancy rule in a CC | Further study is needed if the ON/OFF duty cycle should be specified for the unlicensed spectrum for achieving effective coexistence with Wi-Fi. |
| Resource occupancy rule in a LTE Burst | Further study is needed if the minimum resource occupancy rule in a LTE Burst must be specified for achieving effective coexistence with Wi-Fi. E.g., if traffic is less than the minimum resource occupancy, unlicensed spectrum usage is not permitted by LTE. |

TABLE 3

Figure 16:
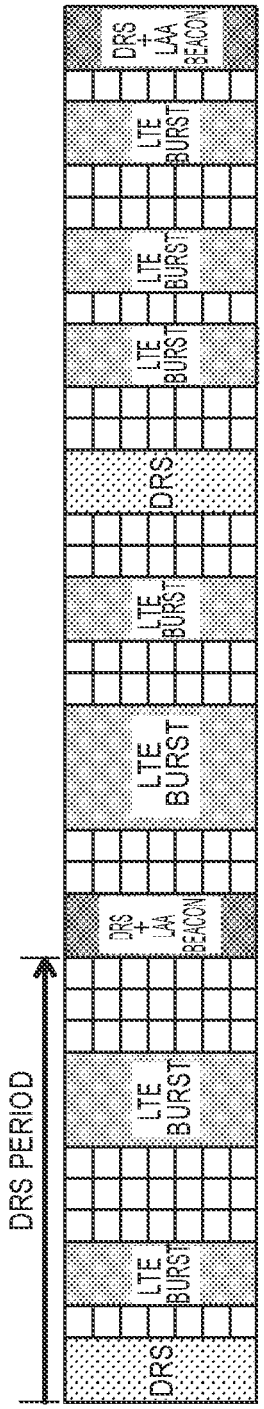
FIG. 16 is a diagram according to additional statement.

| Functionality | Description Coexistence with other LAA services |
|---|---|
| PCI (Physical Cell ID) collision avoidance mechanism | Either UE assisted or eNodeB based PCI collision avoidance mechanism should be introduced. |
| LTE Beacon (Broadcast channel) transmission | Unlicensed spectrum usage information should be broadcasted for other operators. If DRS will be used for Synchronization in unlicensed spectrum, LTE Beacon can be transmitted along with the DRS. (see FIG. 16) |
| Resource allocation rule | Further study is needed that a resource allocations rule should be standardized for achieving tight coordination when same CC sharing by more than one LAA services. |

TABLE 4

| Functionality | Description Radio access |
|---|---|
| Synchronization | Reusing DRS as baseline. Further Study is needed for eNodeB behavior if LBT is applied and eNodeB detect higher interference than the threshold during LBT. |
| Multi-antenna Transmission support and necessity feedbacks | Further study is needed which transmission modes are supported in unlicensed spectrum and how eNodeB achieve feedbacks from UE if unlicensed spectrum is used on an "on demand" basis. |
| HARQ protocols | Further study is needed for HARQ design especially when unlicensed spectrum is used on an "on demand" basis. |
| Scheduling and necessary feedbacks | Further study is needed how eNodeB acquire necessary feedbacks for dynamic scheduling from UE if unlicensed spectrum is used on an "on demand" basis. |
| Hopping | In addition to support frequency hopping in the exiting specification, further study is needed if inter-CC Hopping is effective in unlicensed band operation when eNobeB can use more than 2 CC. |

TABLE 5

| Functionality | Description Radio access |
|---|---|
| UL transmission Timing adjustment | PRACH may be introduced in unlicensed spectrum. |
| UL transmission power control | Further study is needed if it's enough to reuse the existing UL TPC mechanism. |
| UL sounding | Note there is no need to consider UL sounding if frequency domain dynamic scheduling is not supported in unlicensed spectrum. |

[Additional Statement 2]

(1. Introduction)

Study on Licensed-Assisted Access (LAA) using LTE was approved.

In-device, co-channel, and adjacent channel intra-RAT and inter-RAT coexistence scenarios should be considered. In addition this SI's focus is on LTE Carrier Aggregation configurations and architecture where one or more low power Scell(s) operates in unlicensed spectrum and is either DL-only or contains both UL and DL and where the PCell operates in licensed spectrum and can be either LTE FDD or LTE TDD. In this additional statement, we consider the deployment scenarios and evaluation methodologies under the consideration of the above assumption.

(2. Deployment Scenarios)

In this section, we consider deployment scenarios for LAA. Deployment models of this SI can be categorized into the following two models:

1) co-located cells
2) non co-located cells with ideal backhaul

In the case where the coverage area is quite different from the licensed carrier, e.g. Macro cell and RRH unlicensed cell, it's difficult to control the unlicensed carrier on such a large coverage area. Moreover, in such case, licensed small cells should be used considering the fairness with WiFi. Therefore, we assume that the main scenario is that the LAA cells are co-located with small cells as shown in FIG. 17. We propose to reuse and modify the small cell enhancement (SCE) scenarios for LAA. For example, the frequency is changed from 3.5 GHz into 5 GHz.

Proposal 1: The small cell enhancement (SCE) scenarios with minimum modifications should be reused for the LAA SI evaluations.

We study both indoor and outdoor deployments. Therefore, we propose to reuse Scenario 2b for indoor deployment and Scenario 2a for outdoor deployment as the same scenarios for the LAA SI (Table 6).

Proposal 2: Scenario 2b for indoor deployment and Scenario 2a for outdoor deployment should be used for the LAA SI evaluations.

TABLE 6

| Scenario | Reused from |
|---|---|
| Indoor | TR36.872[small cell] Scenario 2b |
| Outdoor | TR36.872[small cell] Scenario 2a |

LAA Cell and WiFi AP Deployment

We should consider the following situations.
1) Coexistence with WiFi
2) Coexistence with different operators' LAA cells.

We modify the cell deployment from small cell scenarios for evaluating the impact on WiFi and unlicensed band. We change small cells into LAA cells and WiFi AP and categorize into 4 patterns. Table 7 is the proposed deployment scenario. Comparing the pattern A and pattern B, we can evaluate the impact of coexistence with WiFi. Comparing Pattern C or Pattern D, we can evaluate the impact of coexistence with different operators' LAA cells.

Proposal 3: Deployment scenario for the LAA cells and WiFi APs are given in the table 7.

TABLE 7

| Scenario cells | Outdoor | | | Indoor (sparse) | | | Indoor (dense) | | |
|---|---|---|---|---|---|---|---|---|---|
| | WiFi AP | LAA cell (operator A) | LAA cell (operator B) | WiFi AP | LAA cell (operator A) | LAA cell (operator B) | WiFi AP | LAA cell (operator A) | LAA cell (operator B) |
| Pattern A | 4 | 0 | 0 | 2 | 0 | 0 | 4 | 0 | 0 |
| Pattern B | 2 | 2 | 0 | 1 | 1 | 0 | 2 | 2 | 0 |
| Pattern C | 2 | 1 | 1 | N/A | N/A | N/A | 2 | 1 | 1 |
| Pattern D | 0 | 2 | 2 | 0 | 1 | 1 | 0 | 2 | 2 |

UE Dropping Scenario

We also modify the UE dropping scenario from small cell scenarios. We propose the total number of UEs per Wi-Fi cell and LAA cell is 10. Some of the UEs can connect to both the Wi-Fi and the LAA cells. We propose the UE dropping as shown in Table 8.

Proposal 4: We propose to use UE dropping scenario as given in the table 8.

TABLE 8

|  | LTE only UE | WiFi only STA | User terminal (Both LTE UE and WiFi STA) |
|---|---|---|---|
| Pattern A | — | 40 (10 for each AP) | — |
| Pattern B | — | — | 20 (10 for each operator per cell) |
| Pattern C | — | — | 20 (10 for each operator per cell) |
| Pattern D | 40 (10 for each operator per cell) | — | — |

Other Noted Simulation Conditions
Additionally, we assume the following conditions:
1) The bandwidth is 20 MHz (1CC)
2) The WiFi is IEEE802.11ac
3) 2 Tx Ant and 2 Rx Ant
(3. Evaluation Methodologies)
LAA cell should not impact WiFi services (data, video and voice services) more than an additional WiFi network on the same carrier. We consider performance metrics for the estimation of the fairness between the LAA and the WiFi as shown in Table 9.

TABLE 9

| Item | description |
|---|---|
| LTE User throughput (for each Operator) | Full buffer traffic model; mean, 5%, and CDF of user throughput. |
| LTE System throughput (for each Operator) |  |
| WiFi User throughput | Full buffer traffic model; mean, 5%, and CDF of user throughput. |
| WiFi System throughput |  |

For example, the impact on WiFi throughput is evaluated as follows using the above performance metrics.
1) WiFi throughput is X in case of pattern A.
2) WiFi throughput is Y in case of pattern B.
If X=<Y, then LTE-U achieves the fairness to the WiFi network.
Proposal 5: Performance metrics to be used for measuring WiFi network fairness is given in the table 9.

INDUSTRIAL APPLICABILITY

The present application is useful for radio communications fields.

The invention claimed is:

1. A base station comprising:
a controller including a processor and memory coupled to the processor, the processor configured to manage a first cell and a second cell and communicate with a user terminal by carrier aggregation which is applied to the first cell and the second cell, the first cell being allocated a licensed band requiring a license and the second cell being allocated an unlicensed band not requiring a license; and
a transmitter, wherein
the processor is further configured to select at least one carrier from the unlicensed band based on a result of carrier sensing in the second cell;
the transmitter is configured to transmit a synchronization signal used for synchronization between the second cell and the user terminal, by the at least one carrier; and
the transmitter is configured to transmit an instruction message to the user terminal through the first cell, the instruction message instructing the user terminal to perform a detection operation of the synchronization signal for all or part of the at least one carrier.

2. The base station according to claim 1, wherein the transmitter is configured to transmit configuration information of the second cell to the user terminal through the first cell, based on a detection report indicating a result of the detection operation from the user terminal, the configuration information including a carrier available for the carrier aggregation among the carriers.

3. The base station according to claim 1, further comprising a carrier sense controller including a processor and memory coupled to the processor of the carrier sense controller, the processor of the carrier sense controller is configured to determine whether the carrier sensing is performed, based on a radio resource status of the first cell.

4. The base station according to claim 1, wherein the controller is configured to receive the detection report indicating the result of the detection operation from the user terminal and thereafter, provide the user terminal with a carrier sense instruction for a carrier specified based on the detection report.

5. A user terminal comprising:
a controller including a processor and memory coupled to the processor, the processor configured to communicate with a base station by carrier aggregation which is applied to a first cell and a second cell, the base station managing the first cell allocated a licensed band requiring a license and the second cell allocated an unlicensed band not requiring a license;
a receiver, and a transmitter, wherein
the receiver is configured to receive an instruction message from the base station through the first cell, the instruction message instructing the user terminal to detect a synchronization signal used for synchronization with the second cell, the synchronization signal being transmitted by at least one carrier among the unlicensed band,
the processor is configured to detect the synchronization signal on all or part of the at least one carrier, based on the instruction message; and
the transmitter is configured to transmit a detection report indicating a result of the detection to the base station through the first cell.

6. The user terminal according to claim 5, further comprising a carrier sense controller including a processor and memory coupled to the processor of the carrier sense controller, the processor of the carrier sense controller is configured to perform carrier sensing on the carrier specified by the instruction, based on a carrier sense instruction performed by the base station through the first cell.

7. A base station comprising:
a controller including a processor and memory coupled to the processor, the processor configured to manage a first cell and a second cell and communicate with a user terminal by carrier aggregation which is applied to the first cell and the second cell, the first cell being allocated a licensed band requiring a license and a second cell being allocated an unlicensed band not requiring a license; and a transmitter, wherein the processor is further configured to select at least one carrier from the unlicensed band based on a result of carrier sensing in the second cell, and the transmitter is configured to transmit, to the user terminal through the first cell, a discovery signal (DRS) used for synchronization between the second cell and the user terminal, by the at least one carrier, information indicating the at least one carrier, information indicating a timing in the at least one carrier, and configuration information of the second cell.

8. The base station according to claim 7, wherein the transmitter is configured to transmit a synchronization signal used for synchronization between the second cell and the user terminal and user data in the same subframe by the carrier in a time division manner.

9. The base station according to claim 7, wherein the transmitter is configured to transmit a synchronization signal used for synchronization between the second cell and the user terminal, user data, and the reservation channel including a length of a subframe occupying the unlicensed band in a host station, in the same subframe by the carrier in a time division manner.

10. The base station according to claim 7, wherein the transmitter is configured to transmit a random access preamble transmission instruction to the user terminal through the first cell, the random access preamble transmission instruction including preamble sequence configuration information for the second cell along with the timing and the configuration information of the second cell.

11. A user terminal comprising:

a controller including a processor and memory coupled to the processor, the processor configured to communicate with a base station by carrier aggregation which is applied to a first cell and a second cell, the base station managing the first cell allocated a licensed band requiring a license and the second cell allocated an unlicensed band not requiring a license, and a receiver configured to receive from the base station through the first cell, information indicating at least one carrier of the unlicensed band, information indicating a timing in the at least one carrier, configuration information of the second cell, and a discovery signal (DRS) used for synchronization between the second cell and the user terminal, by the at least one carrier, wherein the at least one carrier is determined by the base station based on a result of carrier sensing in the second cell.

12. The user terminal according to claim 11, wherein the receiver is configured to receive a random access preamble transmission instruction including the preamble sequence configuration information for the second cell along with the carrier, the temporal timing, and the configuration information of the second cell, which are transmitted from the base station through the first cell, and the user terminal further comprises a transmitter configured to transmit a random access preamble to the base station through the second cell in response to reception of the preamble transmission instruction.

* * * * *